United States Patent
Short, III et al.

(10) Patent No.: US 7,085,775 B2
(45) Date of Patent: Aug. 1, 2006

(54) DATABASE METHOD AND SYSTEM FOR CONDUCTING INTEGRATED DISPATCHING

(75) Inventors: Charles F. Short, III, Belvedere, CA (US); Sanjiv Prabhakaran, San Jose, CA (US)

(73) Assignee: Sidewinder Holdings Ltd., Coppell, TX (US)

( * ) Notice: Subject to any disclaimer, the term of this patent is extended or adjusted under 35 U.S.C. 154(b) by 511 days.

(21) Appl. No.: 09/981,686

(22) Filed: Oct. 17, 2001

(65) Prior Publication Data

US 2002/0188702 A1 Dec. 12, 2002

Related U.S. Application Data

(63) Continuation of application No. 09/204,325, filed on Dec. 2, 1998, now abandoned, which is a continuation-in-part of application No. 09/057,375, filed on Apr. 8, 1998, now abandoned.

(60) Provisional application No. 60/067,444, filed on Dec. 3, 1997, and provisional application No. 60/043,224, filed on Apr. 9, 1997.

(51) Int. Cl.
*G06F 17/30* (2006.01)

(52) U.S. Cl. .................. 707/104.1; 707/200; 707/1; 705/1; 342/457.17; 342/357.01; 340/572.1; 455/404.2; 377/58; 345/411; 345/412.2

(58) Field of Classification Search ................ 701/213, 701/208, 209, 117; 342/357.01, 457.17; 705/1; 345/411–412.2; 235/472.01; 340/572.1; 707/10, 707/1, 200, 104.1; 455/404.2; 377/58
See application file for complete search history.

(56) References Cited

U.S. PATENT DOCUMENTS

| | | | | |
|---|---|---|---|---|
| 4,210,962 A | | 7/1980 | Marsh et al. | |
| 4,688,244 A | * | 8/1987 | Hannon et al. | 377/58 |
| 4,750,197 A | * | 6/1988 | Denekamp et al. | 455/404.2 |
| 4,804,937 A | | 2/1989 | Barbiaux et al. | |
| D306,720 S | | 3/1990 | Flies | |
| 5,265,006 A | | 11/1993 | Asthana et al. | |
| 5,321,605 A | | 6/1994 | Chapman et al. | |
| 5,541,848 A | | 7/1996 | McCormack et al. | |
| 5,627,517 A | * | 5/1997 | Theimer et al. | 340/572.1 |
| 5,636,122 A | | 6/1997 | Shah et al. | |
| 5,659,486 A | | 8/1997 | Tamiya | |
| 5,737,727 A | | 4/1998 | Lehmann et al. | |
| 5,758,313 A | | 5/1998 | Shah et al. | |
| 5,904,727 A | * | 5/1999 | Prabhakaran | 701/208 |
| 5,922,040 A | * | 7/1999 | Prabhakaran | 701/117 |
| 5,944,769 A | | 8/1999 | Musk et al. | |
| 5,987,463 A | * | 11/1999 | Draaijer et al. | 707/10 |
| 6,041,402 A | | 3/2000 | Cannon et al. | |
| 6,073,007 A | * | 6/2000 | Doyle | 455/412.2 |
| 6,292,657 B1 | * | 9/2001 | Laursen et al. | 455/411 |

(Continued)

OTHER PUBLICATIONS

Queree, Vehicle Integration of Fleet Management Systems, IEE, Colloquium, 1993, pp. 10/1–10/3.*

Feijoo et al., A System for Fleet Management using Differential GPS and VHF Data Transmission Mobile Networks, Procedings of the IEEE–IEE, 1993, pp. 445–448.*

(Continued)

*Primary Examiner*—Frantz Coby
(74) *Attorney, Agent, or Firm*—Townsend and Townsend and Crew LLP

(57) ABSTRACT

A technique for integrating a pre-existing business system with a fleet management system. The pre-existing business system includes, for example, an accounting system, a warehousing system, a dock management system, a yard management system. These fleet management system uses, for example, a combination of a raster map and vector data to provide an easy-to-read display for managing objects or articles, e.g., vehicle, container. The method uses a host gateway to provide a TCP/IP or like interface between the various systems.

22 Claims, 17 Drawing Sheets

U.S. PATENT DOCUMENTS 6,313,791 B1 * 11/2001 Klanke .................. 342/357.17
6,339,745 B1 *  1/2002 Novik ........................ 701/208
6,394,354 B1 *  5/2002 Wilz et al. ............. 235/472.01
6,529,731 B1 *  3/2003 Modzelesky et al. ....... 455/427

OTHER PUBLICATIONS

"CONFIDENT ™," Product brochure for Randtec Incorporated 10340 Democracy Lane, Fairfax, VA (no data).
"Freight Billing with Travel Copy" Product brochure for Synergistic Systems, Inc., Neptune Beach, FL (no date).
"Freight Billing with Travel Copy" product Information Synergistic Systems, Inc., Neptune Beach, FL (1998).
"Manhattan Associates, Inc." company information on Manhattan Associates, Inc. from hoovers.com (1998).
"Manhattan Associates, Inc." company information on Manhattan Associates, Inc. from infoseek.com (1998).
"Manhattan Associates, Inc.," company profile of Manhattan Associates, Inc. from manhattanassociates.com (1998).
"Manhattan Associates" company profile of Manhattan Associates, Inc. from manhattanassociates.com (1998).
"PkMS®–Your Warehouse Management System Solution" product information from Manhattan Associates Atlanta, GA available at manhattanassociates.com (1998).
Product brochure for Randtec Incorporated, 10340 Democracy La., Farifax, VA 22030 (no date).
Product information from randtec.com/products.htm for Randtec Incorporated 10340 Democracy La., Fairfax, VA 22030 (1998).
"SLOT–IT™5.0 System Solution" product information from Manhattan Associates Atlanta, GA available at manhattanassociates.com (1998).
"Symbol Technologies: Innovative Systems, Products & Technologies" product information Symbol Technologies, Inc. Holtsville, New York, available at symbol. com (1998).
"Symbol UK–Lomas" product Information Symbol Technologies, Inc. Holtsville, NY, available at symbol.com (1998).
"Synergy Dispatch®" product information Synergistic Systems, Inc., Neptune Beach, FL (1998).
"Synergy Dispatch ®" Product brochure for Synergistics Systems, Inc., Neptune Beach, FL (1996).
"Synergy Freight Billing" product Information Synergistic Systems, Inc., Neptune Beach, FL (1998).
"Synergy Yard Management" product information Synergistic Systems, Inc., Neptune Beach, FL (1998).
"UltraCUBE™," Product brochure for Randtec Incorporated 10340 Democracy La., Fairfax, VA (no date).
"UltraLINK™," Product brochrure for e Randtec Incorporated 10340 Democracy La., Fairfax, VA (no date).
"XATA CORP IMN/Company Description" company profile of XATA Corporation from freedgar.com(1998).
"XATA Corporation" company profile of XATA Corporation from hoovers.com (1998).
"Yard Management System" product Synergistic Systems, Inc., Neptune Beach, FL (1998).

* cited by examiner

DATABASE METHOD AND SYSTEM FOR CONDUCTING INTEGRATED DISPATCHING

CROSS-REFERENCE TO RELATED APPLICATIONS

The present application claims priority to U.S. application Ser. Nos. 60/067,444 filed Dec. 3, 1997, and 09/057,375 filed Apr. 08, 1998 now abandoned, which claims priority to U.S. application Ser. No. 60/043,224 filed Apr. 9, 1997, all commonly assigned, and hereby incorporated by reference for all purposes.

The following commonly-owned copending application is being filed concurrently, and is hereby incorporated by reference in its entirety for all purposes:

U.S. patent application Ser. No. 09/204,327 filed Dec. 2, 1998, now abandoned. Charles F. Short, III and Sanjiv Prabhakaran entitled, "FULLY INTEGRATED DISPATCHING SYSTEM AND METHOD,".

APPENDIX

One or more embodiments of a novel fleet management system according to the present invention include a host gateway that comprises an MIS gateway coupled to a relational database. The relational database has a configuration in accordance with the Entity-Attribute-Relationship described by an attached appendix comprising 24 pages, which is incorporated herein by reference in its entirety for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates to a technique for fleet management. The present invention is illustrated as an example with regard to a technique for computer aided dispatching a fleet of vehicles by way of a map presented on a display, but it will be recognized that the invention has a wider range of applicability. Merely by way of example, the invention can be applied to other types of transportation, mapping, and the like.

As the world becomes more industrialized and populated, transportation requirements also have increased rapidly. In particular, the number of vehicles such as automobiles, trucks, vans, and the like on typical city highways has increased to levels such that traffic jams are now a way of life for a typical driver using these highways as a means for travel. In fact, some of these highways are so constricted that anyone using them can experience significant delays often unexpectedly due to problems such as accidents, road construction, and others. These problems also exist on other transportation ways such as our city streets, airways, and waterways. Accordingly, it is often difficult to predict with any accuracy the location of a vehicle using these transportation ways.

Cities and governments have attempted to resolve some these problems by adding more transportation infrastructure to highly populated areas. This infrastructure often comes in the form of improved roads or highways, train systems, and the like. Unfortunately, roads, highways, and train systems are often difficult to build in highly populated areas and are generally extremely expensive and time consuming to build. In most cases, construction used to provide this additional infrastructure often causes even more traffic congestion and other problems.

Based upon this state of the transportation infrastructure in most industrialized countries, it is often difficult for a company involved in the courier business to accurately track its vehicles and deliveries. The problems mentioned above severely limit the predictability for a fleet manager to track vehicles in its fleet for the pick-up and delivery of information, packages, and people.

Industry also has attempted to resolve some of these problems. For instance, some companies are now providing their couriers with cellular phones and radios so that the dispatcher can communicate with them. Other companies retrofit their vehicles with navigational systems such as LORAN or a global positioning system (GPS) to determine vehicle location. Still other companies are using maps and GPS to track vehicle location by dispatchers at a central office terminal.

One such company is Mobile Information Systems, Inc. ("Mobile Information Systems"), assignee of the present application, which pioneered a technique for implementing easy-to-read maps for tracking vehicle location on a display or workstation at the central office terminal or any terminal. In particular, Mobile Information Systems implemented one of the first techniques for using a raster-type map and vector data for referencing vehicle location. The raster-type map used on a display had features that were easy-to-read for a dispatcher or user. These features were generally geographical in nature and were easier to reference than the maps made using predominately stick-type representations of geographical features. The techniques used by Mobile Information Systems have partly overcome some of the daily problems faced by a fleet manager or the like. It would, however, be desirable to develop other techniques for integrating further aspects of fleet management.

Based upon the above, it would be desirable to develop techniques for further improving the predictability, efficiency, and accuracy of fleet management or tracking any object that can be transported into our roadways, highways, waterways, airways, and the like.

SUMMARY OF THE INVENTION

According to the present invention, a technique including methods and resulting systems for managing a fleet of vehicles or movable objects is provided. In an exemplary embodiment, the technique includes a method for fully integrating pre-existing management systems with vehicle management systems according to the present invention. This technique provides tools to enable easy interfacing between custom vehicle management systems with a pre-existing management system(s).

In one aspect of the present invention, a method for integrating a pre-existing system with a fleet management system is provided. The pre-existing system includes, for example, an accounting system, a warehousing system, a dock management system, a yard management system, and others. The fleet management system is preferably a system such as those described in U.S. application Ser. No. 08/706,211, Ser. No. 08/697,825, Ser. No. 08/706,341, respectively, but can be others). These fleet management systems use, for example, a combination of a raster map and vector data to provide an easy-to-read display for managing objects or articles, e.g., vehicle, container. The method uses a host gateway to provide a TCP/IP or like interface between the various systems. Details of the host gateway are described below.

In an alternative aspect, the present invention provides a system, which includes a pre-existing system and a fleet management system, which are coupled to each other using a host gateway. The pre-existing system includes, for example, an accounting system, a warehousing system, a dock management system, a yard management system, and others. The fleet management system is preferably a system such as those described in U.S. application Ser. No. 08/706,211 now U.S. Pat. No. 5,922,040, Ser. No. 08/697,825, now abandoned, Ser. No. 08/706,341 now U.S. Pat. 5,904,727 These fleet management systems use, for example, a combination of a raster map and vector data to provide an easy-to-read display for managing objects or articles, e.g., vehicle, container. The system uses the host gateway to provide a TCP/IP or like interface between the various systems. Details of the host gateway are described below.

Numerous benefits or advantages are achieved using the present invention over conventional techniques. In some embodiments, the present invention provides a technique for easily connecting pre-existing systems with real-time fleet management modules. The present invention also can be implemented into almost any pre-existing system, independent of platform, by way of a common protocol such as, for example TCP/IP, Java, HTML, and others. In still further embodiments, the present invention improves efficiency of any pre-existing fleet management system or apparatus. The improvement in efficiency can reduce costs and improve profitability by making fleet operators more effective by way of real time processing techniques. These and other benefits are described throughout the present specification, and more particularly below.

The novel features characteristic of the invention are set forth in the appended claims. The invention, however, as well as other features and advantages thereof, will be best understood by reference to the detailed description which follows, when read in conjunction with the accompanying drawings.

DESCRIPTION OF THE SPECIFIC EMBODIMENTS

According to the present invention, a technique including methods and resulting systems for managing a fleet of vehicles or any object or article capable of being moved is provided. In an exemplary embodiment, the technique includes a method for fully integrating pre-existing management systems with vehicle management systems according to the present invention. This technique provides software and hardware tools or software libraries to enable easy interfacing between custom vehicle management systems with a pre-existing management system(s).

Figure 1A:
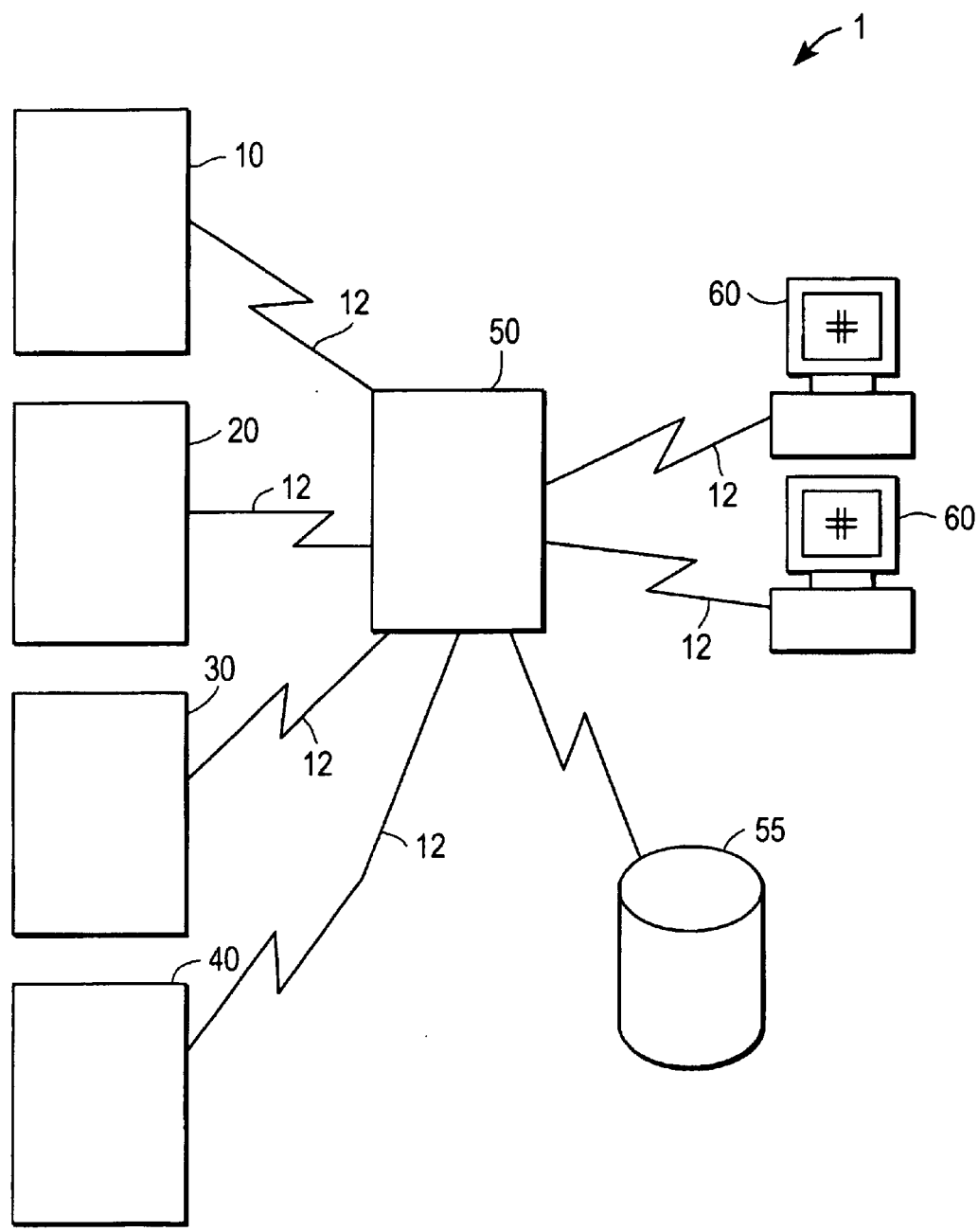
FIGS. 1A to 1D are simplified block diagrams of a fully integrated fleet management system according to embodiments of the present invention.

FIG. 1A is a simplified block diagram of a fully integrated fleet management system according to the present invention. This diagram is merely an illustration and should not limit the scope of the claims herein. The block diagram includes a variety of features such as a business management system (or computer aided dispatching system) 10, a yard management system 20, a warehouse management system 30, and a fleet management system 40, which are commonly defined as "modules." In this diagram, the business management system 10, yard management system 20, and warehouse management system 30 are pre-existing and operable on the same or even different platforms or systems (e.g., UNIX, Windows 95™). Fleet management system 40 can be, for example, almost any system including the ones described in one or more of the above identified patent applications, which are commonly assigned to Mobile Information Systems. The fleet management system can be on any one of the above identified platforms or others, depending upon the application. These systems are each coupled to one another through a communication link or socket connection 12. Preferably, the socket connect is based upon the TCP/IP protocol or the like. A host gateway 50 provides the interface between the various systems, one or more host computers 60 and a database 55 through an MIS gateway. Host gateway 50 can include the MIS gateway, which can be a common access point, throughway, and a database platform, which couples to each of the modules. Details of the host gateway will now be described in greater detail.

Host gateway 50 provides communication services between a host computer 60 and a plurality of legacy systems or pre-existing systems via an MIS gateway using an exchange of messages. In some embodiments, host gateway 50 will also provide communications to an external database 55 using an exchange of messages. Other embodiments will incorporate database 55 into host gateway 50, or in one of the host computers 60. In the presently preferable embodiment, communication between host gateway 50 and MIS gateway is performed through a dedicated TCP/IP "SOCKET." TCP/IP is a reliable Inter-Process Communication protocol provided by many operating systems. The TCP/IP socket has associated with it a communication channel or "PORT," that is identified by a selectable number. Some embodiments can provide the ability to select the port number using a command-line option or configuration file.

Figure 1B:
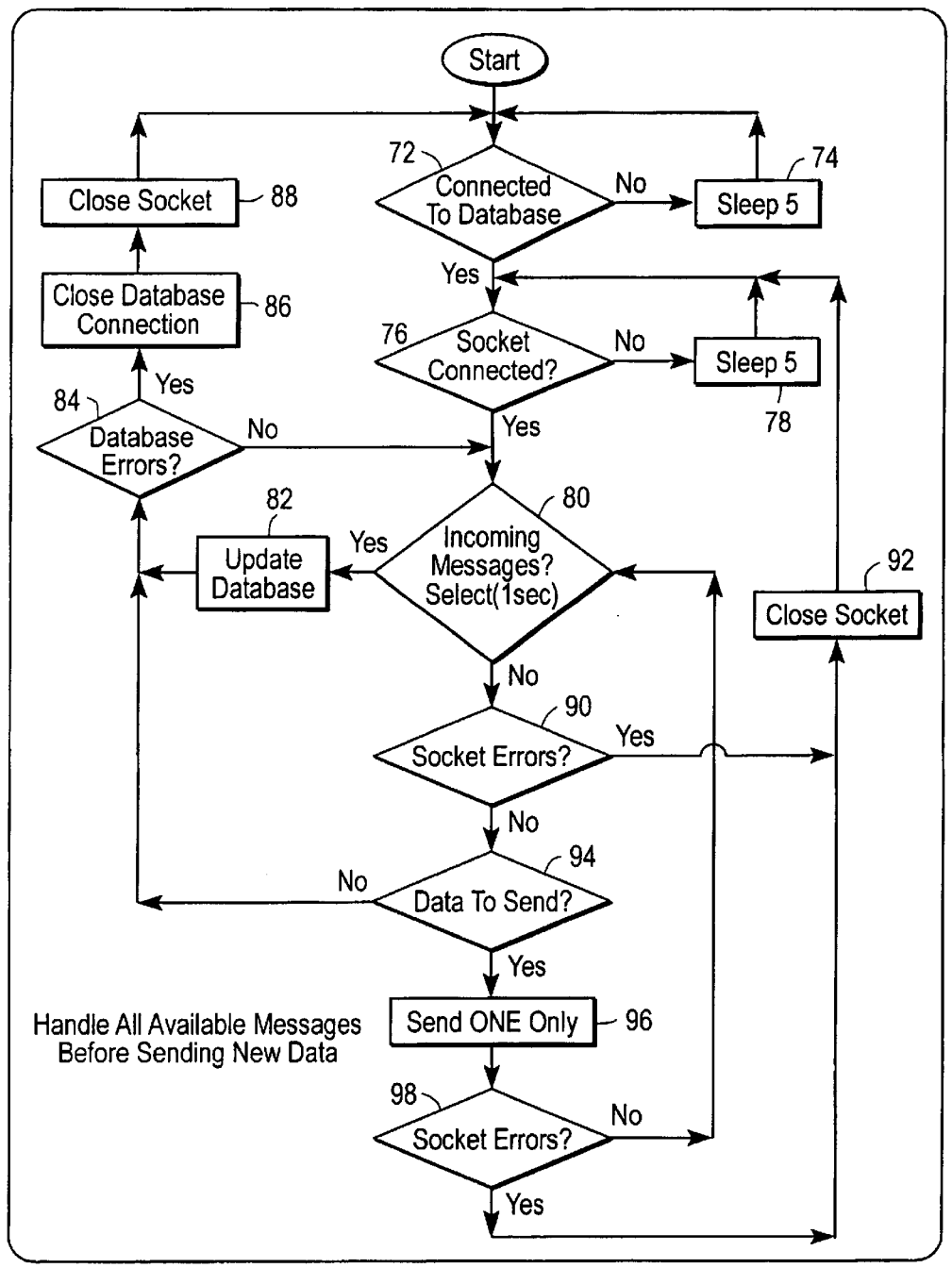

FIG. 1B depicts a simplified flowchart for representative host gateway 50 operation in a particular embodiment according to the present invention. In a decisional step 72, a connection between the host gateway 50 and the database is verified. If there is no present connection, then in a step 74 a wait state is entered for a period of time, that is five seconds in this embodiment, after which decisional step 72 is re-tried. Otherwise, if the connection is in existence, then in a decisional step 76, the socket connection is established and verified. If a connection is not established, then in a step 78, a wait state is entered for a period of time, that is five seconds in this embodiment, after which step 76 is re-tried.

Once the connection is in existence, then in a decisional step 80, a check is made for incoming messages. If an incoming message is present, then in a step 82, an appropriate database is updated. After the database is updated, then in a decisional step 84, a check is made whether any errors occurred during step 82. If no errors occurred, then control passes back to step 80. Otherwise, if an error is discovered, then in a step 86, the database connection is closed and in a step 88, the socket is closed and control passes back to step 72.

After processing the incoming messages, a decisional step 90 checks for socket errors. If a socket error occurrence is detected, then in a step 92, the socket is closed and control passes to step 76 to attempt to re-establish and verify the socket connection. Otherwise, if no socket error was detected, decisional step 94 checks for data to send across the connection. If no data is outstanding, then control passes back to step 84. Otherwise, in a step 96, a message is built and sent for the first data item queued for transmission. Then in a decisional step 98, a check is made for socket errors. If a socket error occurred, then in a step 92, the socket is closed and control passes to step 76 to re-establish and verify the socket connection. Otherwise, if no socket error was detected, control passes back to step 80 to again check for incoming messages.

Figure 1C:
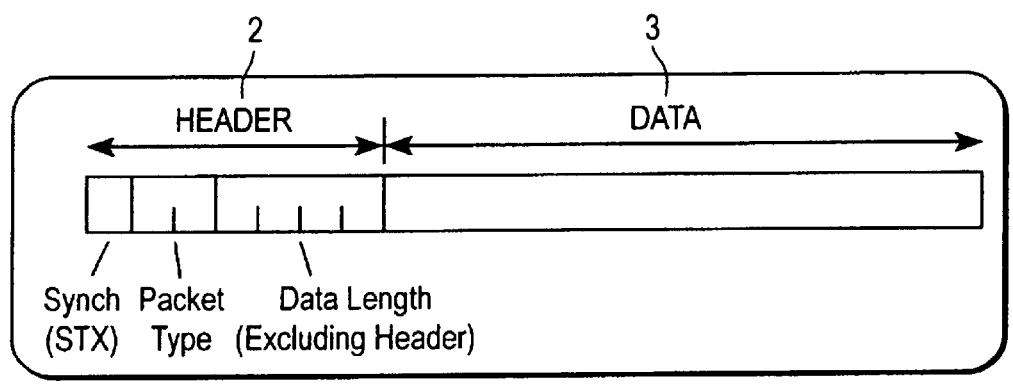

Information is transferred between the host computer and the MIS gateway using a plurality of user definable messages. FIG. 1C depicts a representative message format in a particular embodiment according to the present invention. In the presently preferable embodiment, messages are ASCII character strings. The message strings comprise a header block 2, having a fixed length, and a data block 3, that can vary in length based upon its content. The content has a variable format depending upon the message type. The MIS gateway acknowledges receiving a message by sending an acknowledgment or "reply" message back to the host computer 60 to indicate both the receipt of the message and the validity of the message. Depending on network activity and message traffic, reply messages arrive at the host computer 60 at some time delay after being sent.

Some messages are initiated by the MIS gateway. For example, this type of message will be transmitted to the host computer whenever a dispatcher or driver action causes a status change to a job. Whenever the host gateway 50 receives a message initiated by the MIS gateway, it acknowledges by sending back a reply message of the appropriate type, indicating both the receipt of the message and the validity of the message.

The communication interface can be built on a database platform. This database is called Gateway 2000 for this particular embodiment, but can also be called a variety of other names. Preferably, the database platform is based upon Oracle™ case tools, but can also be others. Other types of database platforms include systems made by Sybase, Informix, and other companies.

In a specific embodiment, the host computer can be coupled directly to the host gateway. Alternatively, the host computer or any workstation, display, or network computer (herein referred to as user interface device) couples to the host gateway by way of a network. The network can be a wide area network, a local area network, or a combination of these. The wide area network can be a proprietary network, the Internet, and others. In a specific embodiment, the user interface device includes a browser for accessing the information through the host gateway. The browser can be one made by a company called Netscape Communications or Microsoft Corporation.

In another embodiment, the interface device can be a mobile unit. The mobile unit can be any suitable wireless device, which is coupled to a wireless network. The wireless network can be based upon one or a combination of technologies including cellular, satellite, totem pole, wireless cable, and others. The wireless user device can be in the form of a personal digital assistant such as a Palm Pilot™ made by a company called 3Com Corporation. Other types of wireless user devices such as pagers, cellular phones, and others can also be used, depending upon the application.

While the foregoing described an embodiment using a messaging technique to relay information from a plurality of legacy systems to a fleet management system, other topologies may be substituted without departing from the scope of the present invention. In one particular embodiment, a wrapper program is provided. The wrapper program encapsulates the legacy system, permitting access to the functions and processes of the legacy system through a well defined interface. Fleet management systems can then access the legacy system through the interface. In another particular embodiment, a data extraction technique may be used. In this technique, tools are used to extract information from a legacy system, reformat the information if necessary, and store the information into a database associated with the fleet management system.

These techniques, or their equivalents, enable a fleet management system to interface to a plurality of legacy systems. Although the present invention has been described in terms of a fleet management system, other systems can also be used without departing from the spirit and scope of the present invention. Embodiments can have one or more or any combination of the following legacy and non-legacy systems. A yard management system tracks information about the arrival and departure of vehicles holding product at a distribution point. Distribution points commonly include warehouses, shipping docks, rail stations and the like. A dock management system tracks information about the loading and unloading of product from vehicles to a storage facility at a distribution point. A warehouse management system tracks information about products stored in a storage facility. Typically, storage facilities are co-located with distribution points. A fleet management system tracks information about routing of vehicles carrying products and orders for shipments of product. A computer aided dispatch (CAD) system includes at least tracking of information about order entries, dispatches, billing, accounting, and reporting. The delineation between the functions of these systems is not always clear, and functions may be combined together or distributed among multiple computing entities.

Figure 1D:
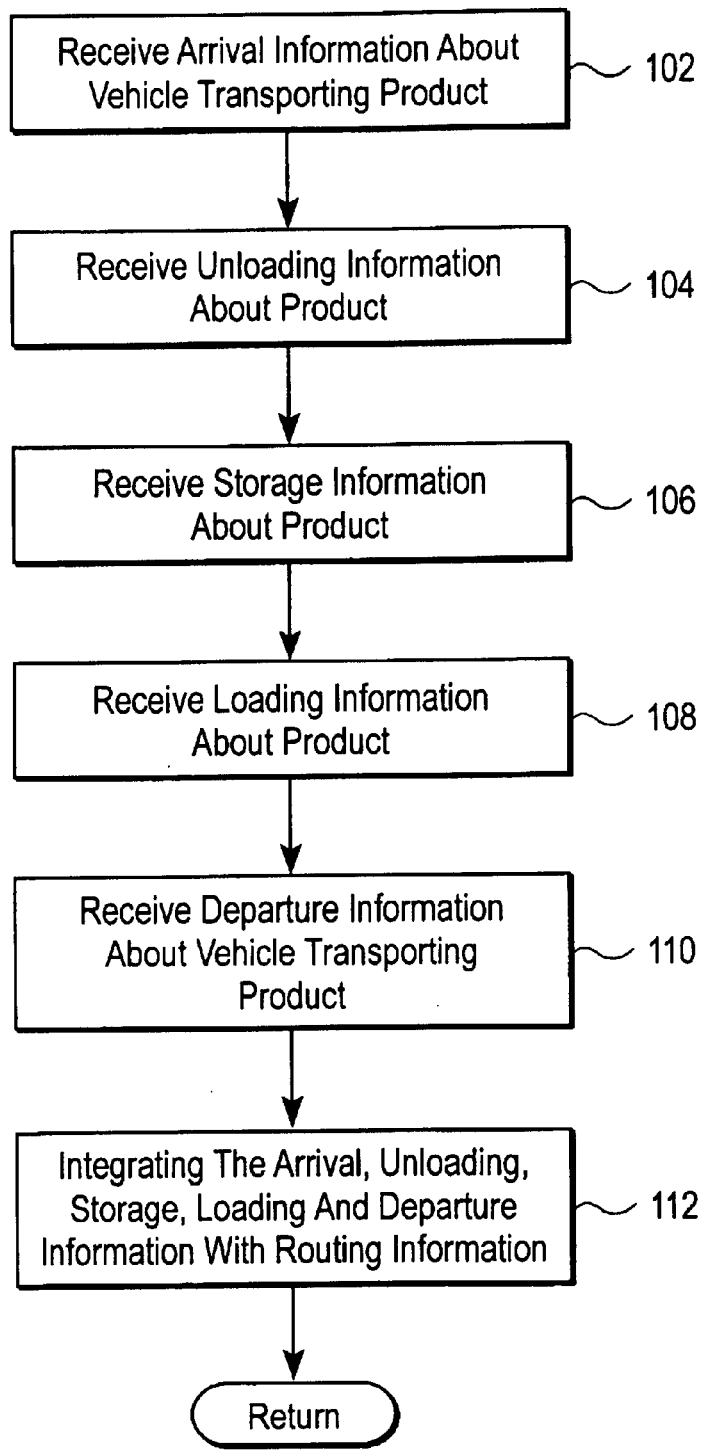

FIG. 1D depicts a flowchart 101 of simplified processing according to a particular embodiment of the method for tracking at least one of a plurality of products. In a step 102, arrival information about one or more vehicles transporting products into a distribution point is received from a yard management system. Then, in a step 104, unloading information about the plurality of products from one or more vehicles transporting the products at a distribution point is received from a dock management system. Next, in a step 106, storage information about the products at the distribution point is received from a warehouse management system. Then, in a step 108, loading information about the plurality of products from storage at the distribution point onto one or more vehicles to transport the products is received from the dock management system. In a step 110, departure information about one or more vehicles transporting the products from a distribution point is received from the yard management system. In a step 112, the arrival information, unloading information, storage information, loading information and departure information are incorporated into routing information about one or more vehicles transporting the products.

Figure 2A:
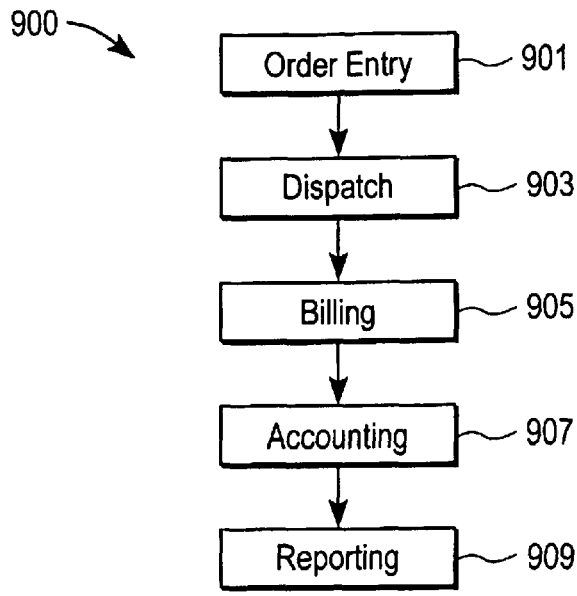
FIGS. 2A to 2F are simplified diagrams of computer aided dispatching systems according to embodiments of the present invention.

In a specific embodiment, the present invention includes a computer aided dispatch system. FIGS. 2A to 2F are simplified diagrams of computer aided dispatching systems according to embodiments of the present invention. These diagrams are merely examples and should not limit the scope of the claims herein. One of ordinary skill in the art would recognize other variations, modifications, and alternatives. The computer aided dispatch (CAD) system can be any suitable computer aided dispatch method and apparatus according to the present invention. The computer aided dispatch system can be programmed via software in a suitable language, such as C, C++, Fortran, etc., into a system including a computer and sufficient memory to handle data from orders. An example of a computer aided dispatch system was sold by an ADAQ Systems Corporation. A simplified flow diagram of a computer aided dispatch method is illustrated by FIG. 2A. The computer aided dispatch system 900 includes at least steps of order entry 901, dispatch 903, billing 905, accounting 907, reporting 909, and others. Each step may comprise a separate software package performing the described functionality. CAD system may thus be implemented by mixing and matching packages from different vendors. For example, any stand alone dispatching system, scheduling system, business management system, etc. can be integrated into the CAD. Further, it would be recognized by one of ordinary skill in the art that other steps and software packages can also be incorporated into a computer aided dispatch system depending upon the particular application.

The step of order entry 901 captures order information for processing an order at the time of an order. The order often comes in by way of a phone call, an e-mail, a phone mail, postal mail, or the like to the computer aided dispatch system. The order information includes elements such as a caller (or company), a phone number (or e-mail number), billing data, origin data, destination data, and other data. The billing data often include a billing name, an address, an authorization number, and the like. Origin data include information with regard to pick-up (or origin) such as a contact name, pickup address, and the like. The destination data include a contact name, destination address, and the like. Of course, other forms of data may also be captured depending upon the particular application.

Optionally, the order entry step occurs automatically or semi-automatically or the like. For example, the order entry step may include a caller identification features such that the caller's name and number automatically download into the computer aided dispatch system memory. The caller can also use a touch tone feature of a conventional phone to input a pick-up location and delivery location. The caller may select a particular location by depressing a unique input number, alphanumeric character, or combination thereof, or the like corresponding to the location. The computer aided dispatch system automatically inputs such caller identification, pick-up location, and delivery location features into memory.

Figure 2B:
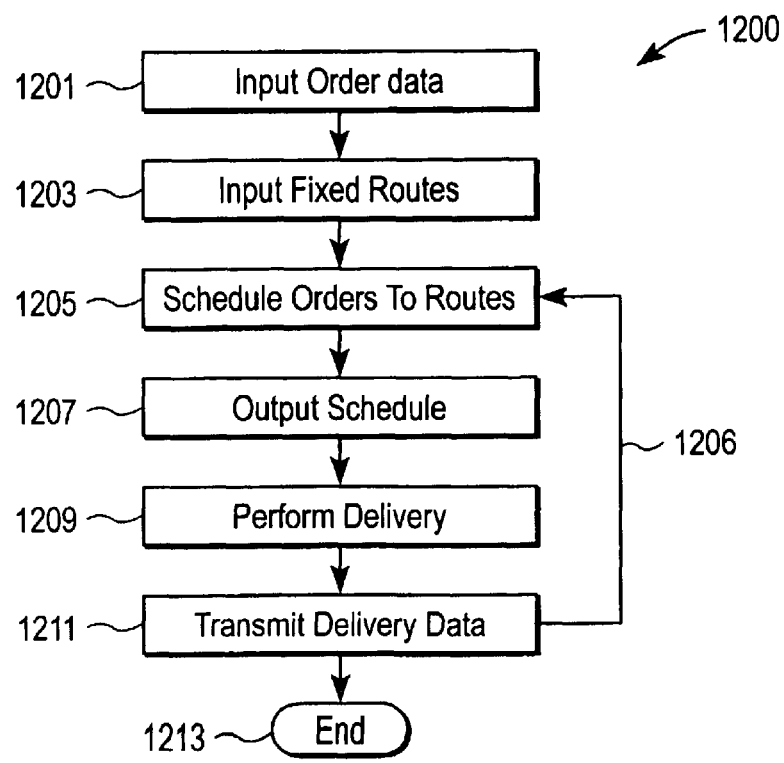
Figure 2C:
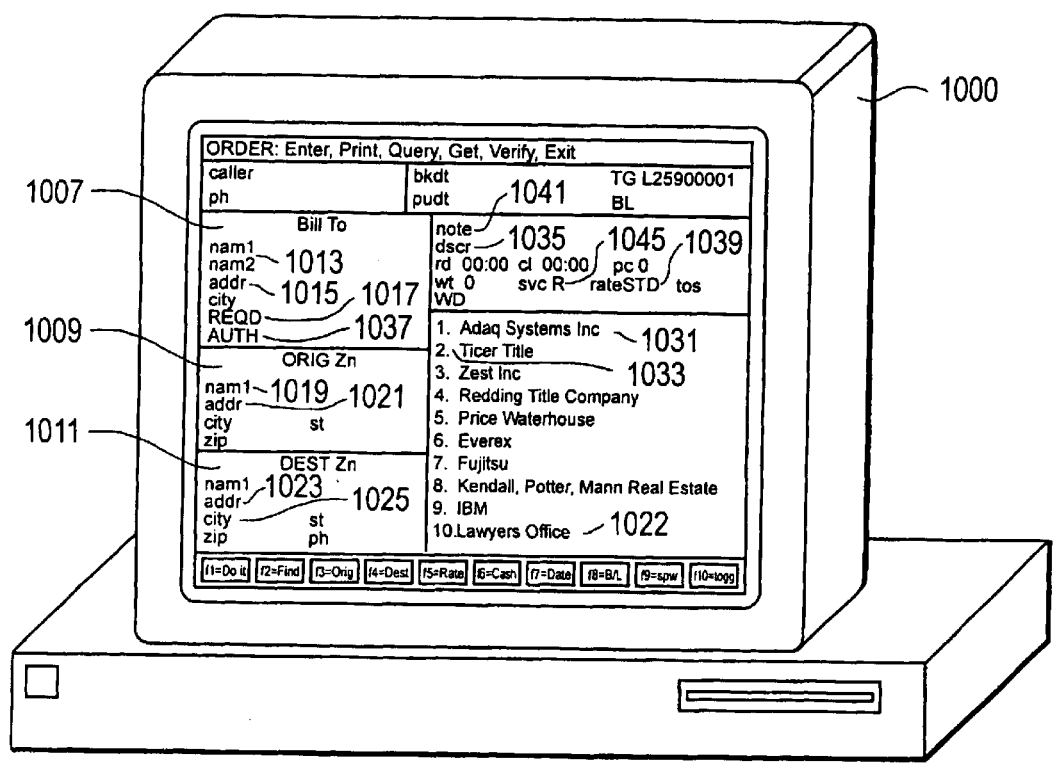

A simplified example of an order entry screen 1000 for order entry 901 is illustrated by FIG. 2C. The order entry screen can be on any suitable computer or dumb terminal at, for example, a dispatch station or the like or a customer location. The order entry screen in the example provides a snap-shot of a customer account. The order entry screen divides into a plurality of regions (or multiple screens), each having data for a selected input. A user may access each section by way of an input device such as function keys f1, f2, f3 . . . fn, and others, hot keys or the like, a mouse in, for example a Windows(TM) environment, or the like. The order entry screen includes a screen portion for caller information 1001 such as a caller field 1003 and a phone number field 1005. The order entry screen also includes screen portions for billing data 1007, origin data 1009, destination data 1011. The billing data 1007 include fields for a billing name 1013, an address 1015, and an authorization number 1017. The origin data 1009 include fields for a contact name 1019 and an address 1021. The destination data include fields for a contact name 1023 and a destination 1025.

Optionally, the order screen can also include a screen portion 1027 identifying common delivery points for each account. The delivery points are listed by, for example, company 1031 and corresponding number 1033. Information such as an address, a contact person, route information and the like, is stored in memory for each company. In a preferred embodiment, a customer accesses the computer aided dispatch system via phone and inputs the delivery and origin data by way of the corresponding number. Alternatively, the user specifies the delivery points for the customer via input device at the dispatch station. As the customer adds additional delivery points, the information is automatically added to the customer account information and stored into memory for later use. Of course, other information can also be displayed on the screen, as well as other techniques for accessing and entering the delivery points.

On the order entry screen, the customer account can also include data such as payment delinquency information 1035, authorization information 1037, customer rate information 1039, customer notes 1041, and other information. The payment delinquency information can be shown on the screen by an indicator such as a flashing "HOLD" indicator or the like. A payment delinquency also places a hold on the account to prevent the user from taking the order from the customer. The user may, for example, release the hold on the account and take the order for the customer and inform the customer of such payment delinquency. Alternatively, a user can refuse to take the order from the customer until payment. If the customer account is seriously delinquent, that is, past a selected number of days such as more than 60 days, more than 90 days, more than 120 days or the like, a second level hold can be placed onto the account. A second level authorization with a selected password can bypass the second hold level to allow the user to the take the order from the customer. Alternatively, the user can refuse to take the order from the customer until payment. Of course, the present system can be tailored to include a selected amount of authorization steps and indications depending upon the application.

Certain customers require the use of authorization information to be provided to the user before the user takes the order from the customer. The authorization information may include, for example, a reference number, a department name, an invoice number, or other information.

As previously noted, the order screen also includes customer rate information 1039 and customer notes 1041, among other information. The customer rate information 1039 includes fields for rates 1043 and corresponding services 1045. The customer notes include any additional information as specified by the customer which are not defined in the other fields as previously described. Other information can include a ready time (if different from the call-in time), a required delivery time, pieces and weight, service type, vehicle type, other reference numbers such as an air bill or the like, an on-screen price quote, and the like.

The dispatch step transfers 903 dispatch information from a dispatch screen, a dispatch ticket, or a combination of both to the dispatch location. The dispatch step transfers the dispatch information via a phone line, a wide area network, a local area network, a pager, or any other communication means available for the particular application. The dispatch information is sent to the dispatch directly, or at selected time prior to the ready time for pre-scheduled or daily jobs. The dispatch location can include multiple dispatch stations, a single dispatch station, or the fleet mobile unit itself. For example, the dispatch step transfers orders with a downtown address to the downtown dispatcher. Alternatively, the dispatch step transfers orders that require trucks to the truck dispatcher. Alternatively, the dispatch step sends the order to the driver directly via pager, radio unit, cellular telephone, or any other available communication means.

In an embodiment using the dispatch screen, the computer aided dispatch system updates the order record with time information such as a dispatch time, a pick-up time, and a delivery time as such times (or in real time). Accordingly, any user with access to the computer aided dispatch system can query a selected order and see the status of the order at a selected time without disturbing any other user.

Figure 2D:
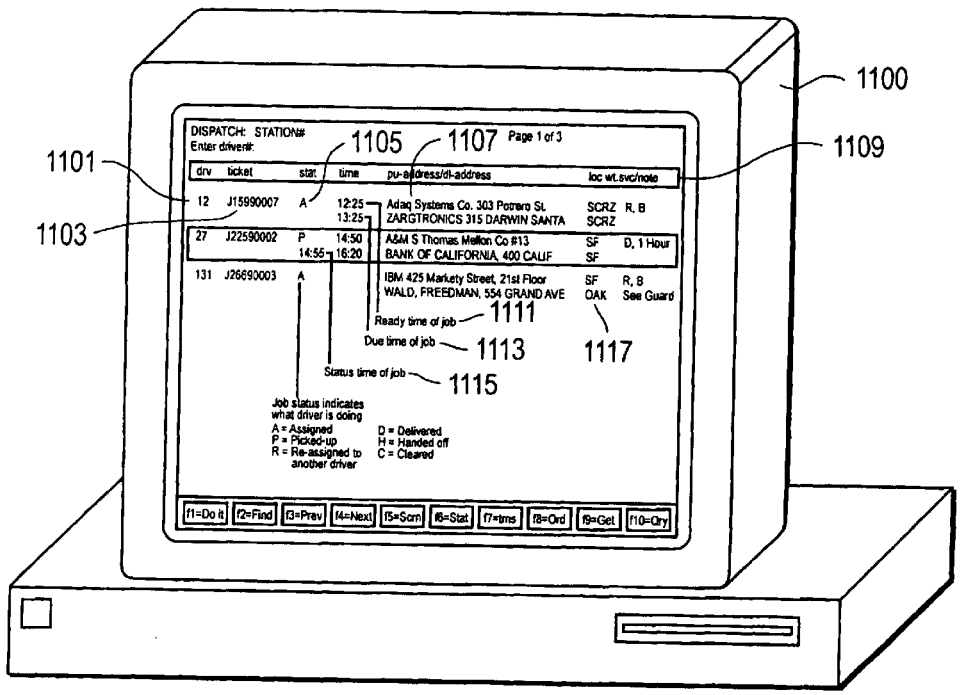

FIG. 2D is a simplified example of a dispatch screen 1100 according to the present invention. The dispatch screen is merely an example and should not limited the invention as described by the claims herein. The dispatch screen 1100 includes driver numbers 1101, ticket numbers 1103, status letters 1105, pickup addresses 1107, notes 1109, ready times 1111, due times 1113, a status time 1115, and other information. The status letter provides a selected letter corresponding to the driver as shown in Table 1.

TABLE 1

Status Letters and Descriptions

| STATUS LETTER | DESCRIPTION |
| --- | --- |
| A | Order Assigned to Driver |
| P | Order Picked-up by Driver |
| R | Order Re-assigned to Another Driver |
| D | Order Delivered by Driver |
| H | Order Handed Off to Driver |
| C | Order Cleared by Driver |

As shown, Table 1 provides an example of status letters and corresponding descriptions. Of course, other types of letters or characters can also be used to designate selected statuses in other applications.

Optionally, the dispatch screen is color for easy identification of selected orders and the like. For example a green highlight of an order indicates an order that requires a delivery time of one hour or less. A red highlight indicates an order with a delivery time of a half an hour or less. Once a selected cut-off time passes, the orders can remain in red, but flash continuously to indicate a missed order or the like. Of course, other color selections and indications can be used depending upon the particular application.

The computer aided dispatch system provides a billing 905 step according to the present invention. The billing step preferably occurs on the same day as the day the order is completed, or more preferably within hours of order completion. Alternatively, the billing occurs on a time schedule such as a weekly basis, a bi-weekly basis, a monthly basis, a quarterly basis, or any other time basis. The computer aided dispatch system automatically (or semi-automatically) outputs the billing information for the selected account at the selected time. The output occurs as, for example, a printout, a download from a direct on-line link to the customer premises, and the like.

The computer aided dispatch system also includes an accounting 907 step with corresponding accounting module or the like. The accounting step provides for cash posting methods, invoicing methods, and other methods of posting payment on a selected order. The accounting module provides credits and account balances to be retrieved by way of a key or any other input means. A credit caused by the driver of the fleet mobile unit may be charged back to the driver and then stored in a selected memory. The module may also calculate driver commissions with a key based upon rate data, delivery information, and the like. A hold status can be placed on a particular account when an account is overdue. Details with regard to a hold status were described in an aforementioned embodiment. The module also provides data from an accounts payable, a payroll, and a general ledger, among others.

A reporting 909 step is also included in the present method. The reporting step provides for reports from memory by way of a selected key. The reporting step includes reports such as sales reports, aging reports, service analysis reports, commission reports, customer activity reports, common caller reports, period processing reports, gross profit reports, revenue distribution reports, payment/adjustment reports, order entry count reports, zone distribution reports, summary exception reports, rate sheet printing reports, sales person reports, driver productivity reports, and others.

FIG. 2B is a simplified flow diagram of a scheduling method 1200 according to the present invention. The scheduling method is performed on the computer aided dispatch system as previously described, but can also be performed on other computer aided dispatch systems and the like. The scheduling method 1200 includes steps such as input order data 1201, input fixed routes 1203, schedule orders to routes 1205, output schedule 1207, perform delivery 1209, transmit delivery data 1211, and reschedule orders to routes 1205 via branch 1206, and others.

In step 1201, order data are input into memory of the computer aided dispatch system. Order data include caller information such as a caller name, a phone number, and the like. Order data also include billing data, origin data, destination data, and others. The billing data include a billing name, a billing address, a billing authorization number, and other information. The origin data include at least a contact name and a contact address. The destination data include at least a contact name and a destination. Order data also include package size and others, time information and data constraints.

The fleet includes a selected number of fleet mobile units with fixed routes (or scheduled routes). A fleet mobile unit performs pick-up and delivery based upon its fixed route typically for efficiency purposes or the like. The scheduling method inputs the fixed routes for the fleet into memory of the computer aided dispatch system in step 1203. The input step occurs by way of standard input devices such as keys, or the like. Alternatively, the fixed route can be entered via the automatic vehicle location apparatus or the like.

In step 1205, the scheduling method via a processing means schedules the order data with a fixed route to provide schedule information. In particular, the scheduling method identifies pick-up and delivery points from the order data, and correlates such pick-up and delivery points to a fixed route. Additional order data such as time constraints, order size, and other information may also be used to determine which order should be placed to the particular fixed route. The scheduling method schedules each order with a fixed route based upon the order data. Criteria for such selection process includes increasing the amount of orders per fixed route such that the cost per order decreases, or the amount of time spent on each order per route decreases. Alternatively, a criteria for such selection process includes optimizing the route based upon the order data and fixed routes. Optimization is often defined as reducing the amount of time necessary between the pick-up and delivery of the order, and increasing the amount of profit for the fixed route or routes as a whole. The schedule information is stored into memory of the computer aided dispatch system, and the like. Of course, other selection criteria and optimization schemes may be used depending upon the particular application.

The scheduling method outputs the schedule information including the schedule with order and corresponding route in step 1207. In particular, the scheduling method retrieves from memory the schedule information and outputs such schedule information to an output device. The output device includes a device such as a line printer, a ticket from a line printer, a screen display, a pager, and others. The output device can be located at, for example, a dispatcher, a fleet mobile unit, or the like. The dispatcher forwards the schedule information to the selected fleet mobile unit with the fixed route. Alternatively, the fleet mobile unit receives the schedule information directly via output device or the like.

The fleet mobile unit performs the instructions on the schedule information for its scheduled orders in step 1209. Upon pick-up of the order the fleet mobile unit transmits (step 1211) pick-up information to the dispatch station or the like. The dispatch station receives the pick-up information and updates the computer aided dispatch system which reflects (or outputs) such changes on, for example, a display screen or the like. The fleet mobile unit periodically transmits time and location information to the computer aided dispatch system via automatic vehicle tracking system. Upon delivery of the order, the fleet mobile unit transmits delivery information to the dispatch station or the like. The dispatch station receives the delivery information and updates the computer aided dispatch system, which reflects such changes on for example memory and a display screen or the like.

By way of branch 1206, the scheduling method reschedules orders and re-routes the fleet mobile unit in step 1205. In particular, the scheduling method via processor reschedules the route and orders for the fleet mobile unit based upon additional information including the pick-up information, delivery information, and time and vehicle location information from step 1211. The re-scheduled information is output (step 1207), the re-scheduled orders are delivered (step 1209), and pick-up and delivery information are re-transmitted to the dispatch station via branch 1206.

Upon completion of the fixed route, the fleet mobile unit returns to home base, and the scheduling method provides new schedule information to the fleet mobile unit. The fleet mobile unit traverses the fixed route based upon a time criteria such as a half day route, a daily route, a weekly route, or the like. The fleet mobile unit can also traverse the route based upon an alternative criteria. Of course, the particular fixed route traversed at a selected time depends upon the particular application.

Figure 2E:
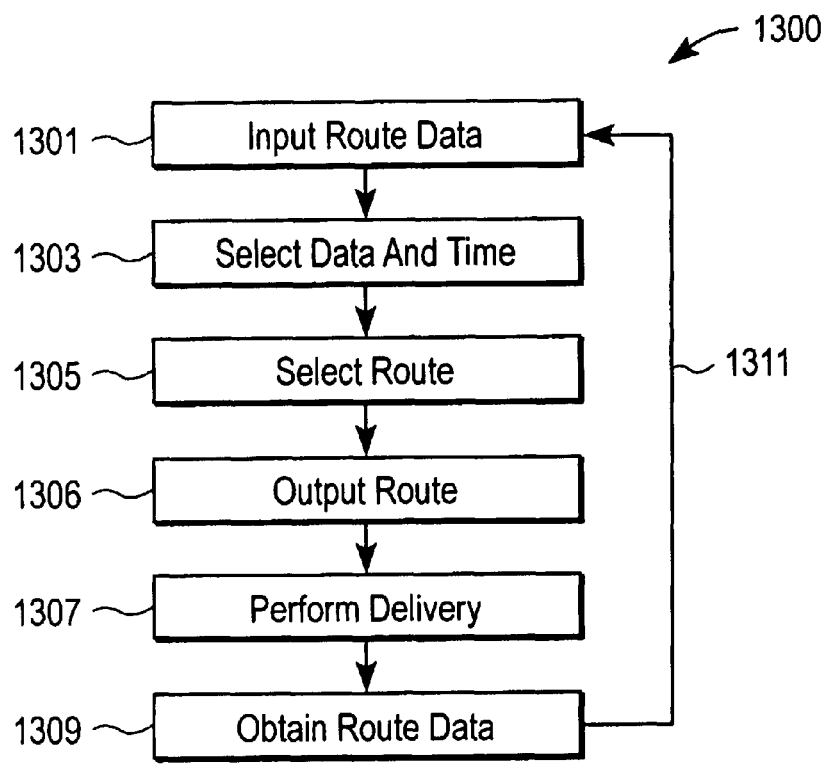

FIG. 2E is a simplified flow diagram 1300 of a route selection method according to the present invention. The route selection method is performed on the computer aided dispatch system as previously described, but can also be performed on other computer aided dispatch systems and the like. The route selection method includes steps such as input route data 1301, select data and time 1303, select route 1305, output selected route 1306, perform delivery 1307, obtain route data 1309, and re-input route data via branch 1311, and others. The route selection method provides a selected route which improves at least delivery times for orders, and reduces costs related to such orders.

In step 1301, route data are input into memory of the computer aided dispatch system. The route data includes geographical locations of fixed routes, but also includes alternative routes. The route data further includes fleet mobile unit information such as vehicle types, history of traffic conditions for each of the fixed routes depending upon the time of year and other factors, and other information. A history of traffic conditions for the alternative routes are also input into the memory of the computer aided dispatch system.

The route selection method requires a time on a date (step 1303) for an order. The order generally includes a separate time on a date for pick-up and delivery, and additional information such as a pick-up location and a delivery location. The time and date can be supplied by a key input, or directly supplied via on-board clock on the computer aided dispatch system to the route selection method. The pick-up and delivery locations can be supplied by any of the previous embodiments, as well as other techniques.

Based upon the times, dates, and pick-up and delivery locations, the route selection method chooses (step 1305) a route for the order(s). In particular, the route selection method scans the history of selected routes including fixed and alternative routes, and determines which fixed route (or alternative route) has less stops and traffic congestion based upon the historical data at a selected time. For example, a particular route may be subject to traffic congestion at a selected time of day or even a selected day in the year based upon events such as people commuting to work, people driving to a sporting event on a holiday, people driving to a major shopping center during Christmas time, or the like.

In step 1306, the route selection method outputs a route to an output device. The output device can be a printer, a display, a memory, or any other means capable of reading the route. The output device can be at, for example, the dispatch location, a mobile unit location, or any other location. The route can also become the fixed route defined in step 1203 of the previous embodiment.

Based upon the route, the fleet mobile unit performs pick-up and delivery of the order(s) in step 1307. The delivery takes place upon the selected day and time for the particular pick-up location and destination. As the fleet mobile unit performs the pick-up and delivery, traffic information such as times, stops, and vehicle congestion is obtained via step 1309. The traffic information is fed back into the route selection method via branch 1311 to the input route data step 1301. Accordingly, the route selection method continuously updates its data base of historical route data upon each pick-up and delivery. The route selection method selects the same or different routes based upon the updated route data base and selected date and time in step 1303. By way of steps 1301 through 1309 via branch 1311, the route selection method provides an improved technique for route selection with each iteration through branch 1311.

Figure 2F:
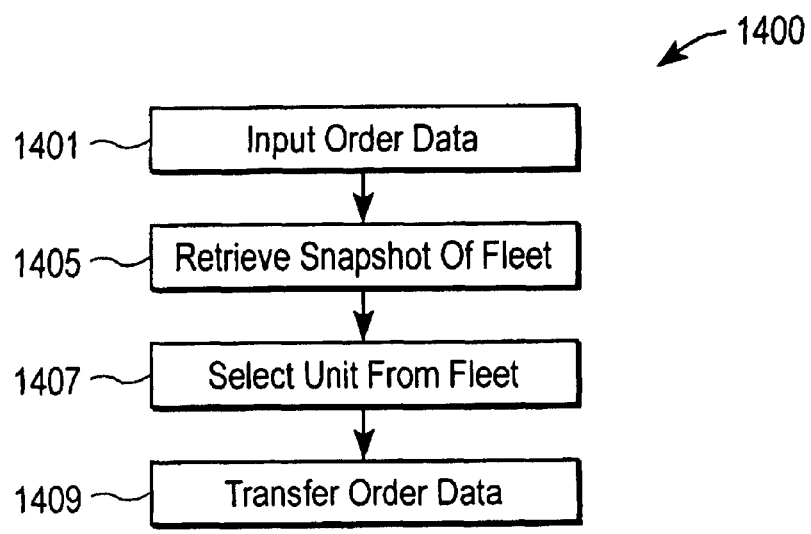

FIG. 2F is a simplified flow diagram of an on-line dispatching method 1400 according to the present invention. The on-line dispatching method is performed on the computer aided dispatch system as previously described, but can also be performed on other computer aided dispatch systems and the like. The on-line dispatching method includes steps such as input order data 1401, retrieve snap-shot of fleet 1405, select unit from fleet 1407, transfer order data 1409, and others.

The on-line dispatching method provides real time dispatching (or in-situ dispatching) based upon the order and status of the fleet mobile units. As an example, the on-line dispatching method allows a customer to place an order via phone or other telecommunication device to the computer aided dispatching system, and the computer aided dispatching system transfers the order by way of two-way messaging or the like to the selected fleet mobile unit. The fleet mobile unit picks-up the order and delivers the order to its delivery point. Pick-up and deliver can occur on the same day, or within the same period of day, or even the same hour and less. In preferred embodiments, the order can be picked-up and delivered within a half an hour or less, or more preferably ten minutes and less.

The on-line dispatching method includes steps of receiving from a customer and inputting order data (step 1401). The order data include a pick-up time, a delivery time, a pick-up location, delivery location, and other information. The on-line dispatching method often occurs at, for example, the dispatch station or the like. The on-line dispatching method goes from the customer to the computer aided dispatch system, and then sent to the fleet mobile unit.

In step 1405, the on-line dispatching method retrieves a "snap-shot" status of the fleet mobile units. The "snap-shot" status can include information such as the aforementioned data in Table 1. In addition, the snap-shot status also includes a time, a vehicle location, a vehicle direction, and other information. The snap shot status is retrieved via the automatic vehicle location system, two-way massaging system, and other system elements. The snap shot status is stored into memory of the computer aided dispatch system.

The on-line dispatching method via processor identifies a fleet mobile unit (step 1407) from the "snap-shot" data which can pick-up and deliver the order within the parameters of the order data. For example, the order data requires a pick-up and delivery location to be in the downtown location. A fleet mobile unit at, for example, a downtown location would be the preferred candidate for pick-up and delivery of the order for the downtown location. Alternatively, a fleet mobile unit closest to the pick-up location and heading into the pick-up location would be a preferred candidate for the order. Alternatively, a fleet mobile unit without any orders, and near the pick-up location and heading toward the pick-up location would be the preferred candidate for the order. Of course, other parameters can also be used for selecting the fleet mobile unit depending upon the particular application.

Upon completion of the step 1409, the on-line dispatching method transfers selected order data to the selected fleet mobile unit. The order data may be transferred via the two-way messaging system, or the computer aided dispatch system, or the like. The fleet mobile unit receives the selected order data and performs the pick-up and delivery of the order within the specified time limits. Data corresponding to the pick-up and delivery are transferred via the automatic vehicle location system to the computer aided dispatch system or the like.

Figure 3A:
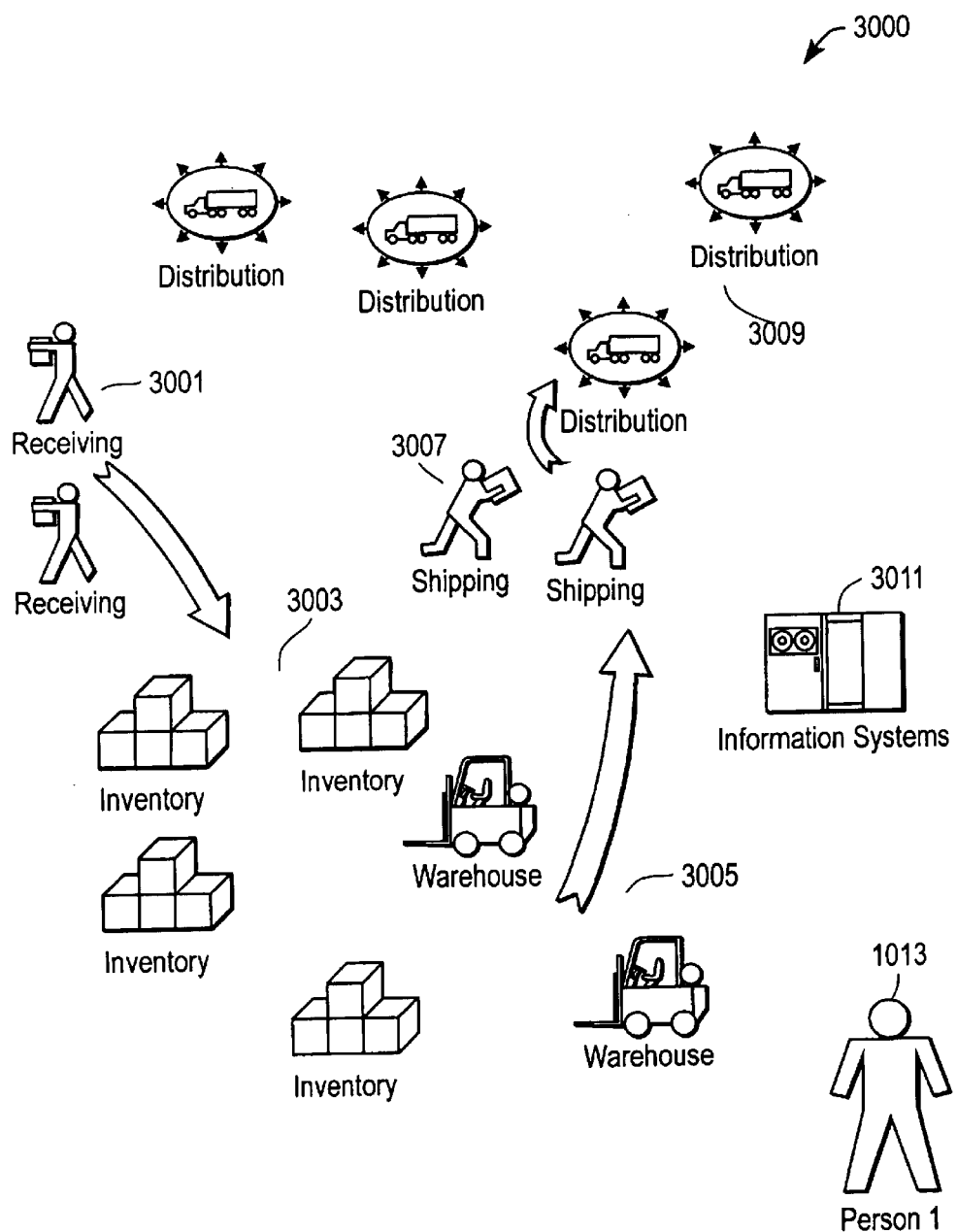
FIGS. 3A to 3C are simplified diagrams of warehouse management systems according to embodiments of the present invention.
Figure 3B:
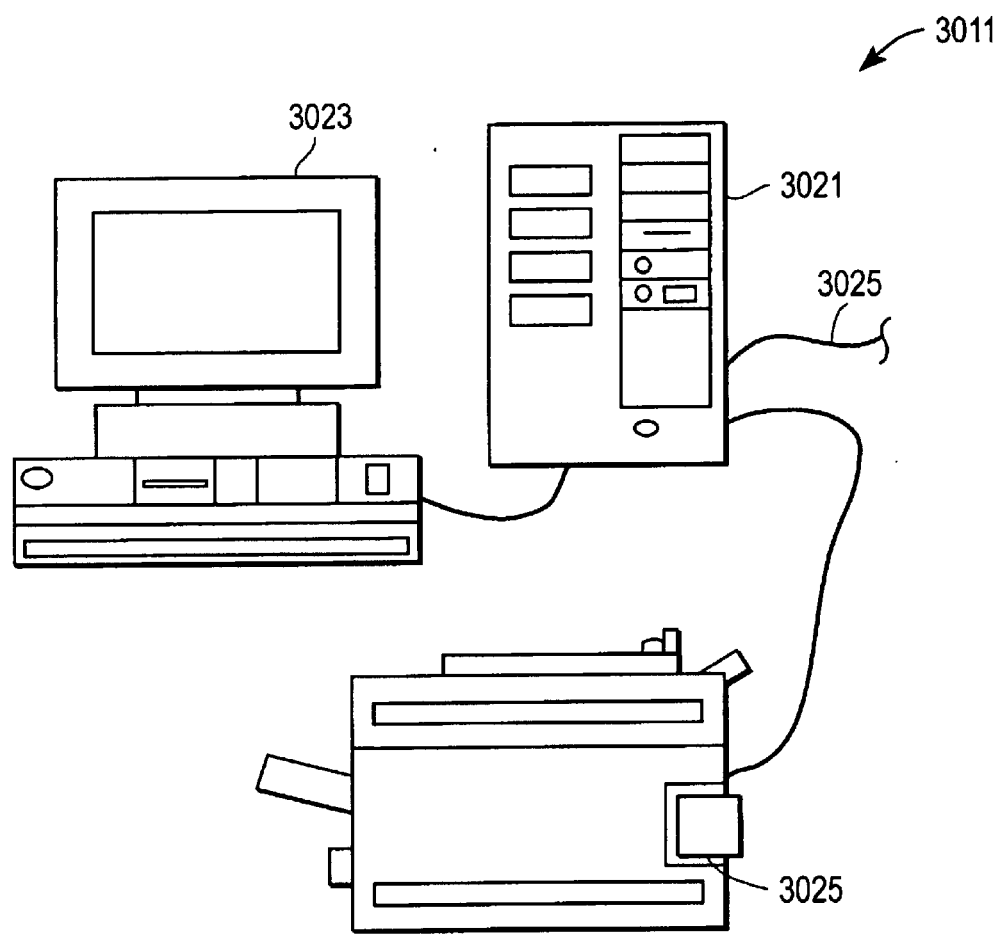
Figure 3C:
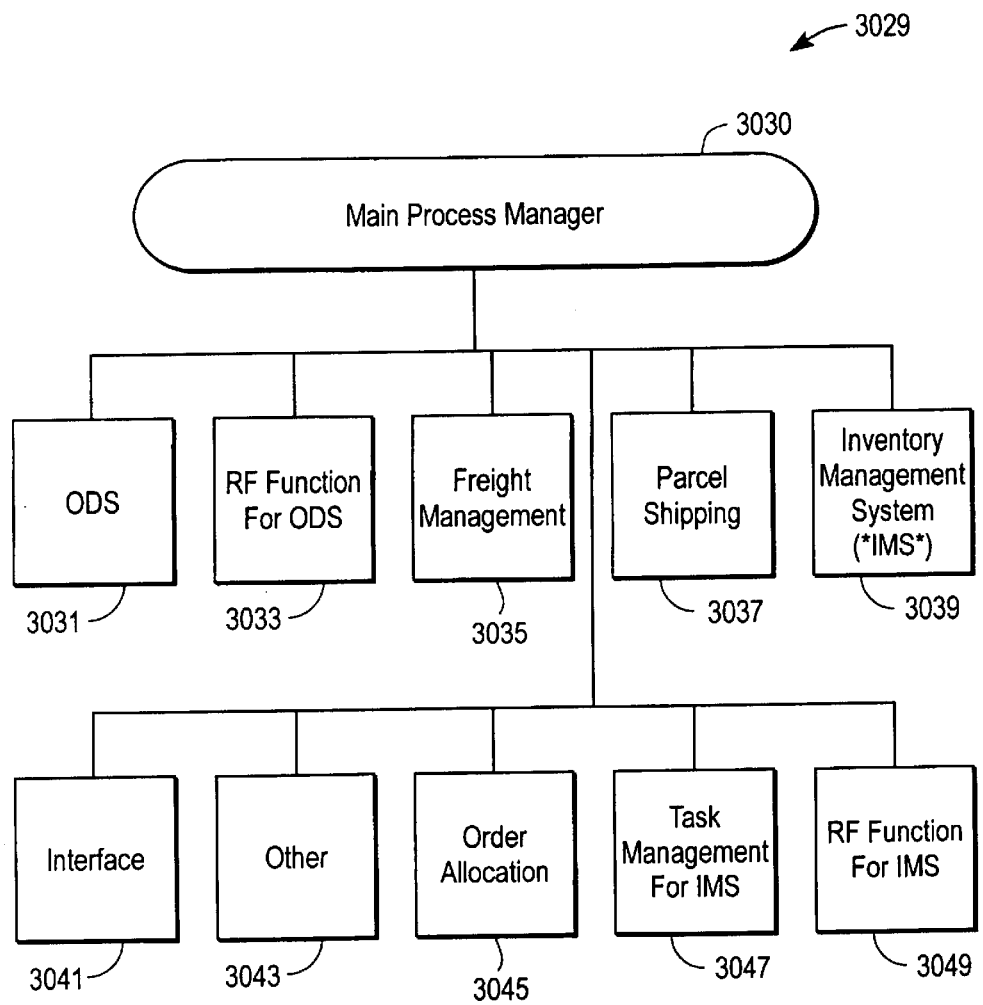

In a specific embodiment, the present invention provides an integrated warehouse management system. FIGS. 3A to 3C are simplified diagrams of warehouse management systems 3000 according to embodiments of the present invention. These diagrams are merely examples and should not limit the scope of the claims herein. One of ordinary skill in the art would recognize other variations, modifications, and alternatives. Referring to FIG. 3A, warehouse management system 3000 generally accepts products from receivers 3001. Products are then transferred into inventory 3003 for storage and queuing purposes. A warehousing operation 3005 organizes the products. The products are then shipped 3007 through a distribution network 3009, which often includes vehicles, such as trucks, planes, trains, ships, and couriers. A central information management system ("MIS") 3011 tracks the products from receiving, inventory, warehousing, shipping, and distribution. Here, a production control or product manager 1013 can track the location of the product at anyone of the above locations, as well as others.

The MIS tracking system 3011 can include a monitor, a server, and an output device, such as the one in FIG. 3B. The MIS tracking system often includes a display 3023, a server 3021, and output device 3025. The display is any suitable unit which can be used for providing high resolution text and graphics. The server can be UNIX based or NT based, as well as others. The output device can print out a variety of items. As merely and example, the output device can print reports, worksheets, process flow sheets, and bar codes, which will be used as labels for the products. The MIS tracking system also couples to a local network via hard ware 3025. Additionally, the local network can be coupled to a wide area network such as the one described above as well as others. The MIS tracking station also includes computer software and/or hardware that is specifically designed for warehouse management.

The software can be represented by the software diagram 3029 of FIG. 3C. The software diagram 3029 includes a variety of elements such as a main process manager 3030, which oversees multiple modules. These modules include at least an outbound distribution system ("ODS") 3031, a radio frequency function module for ODS 3033, a freight management system 3035, a parcel shipping system 3037, an inventory management system ("IMS") 3039, a radio frequency function for IMS 3049, a task management for IMS 3047, an order allocation system 3045, other systems 3043, and an interface module 3041. Of course, the software diagram can also include a variety of other processes in the form of modules or the like.

As merely an example, the ODS module provides for tracking of products. The ODS module maintains a process record of each product as it moves through the warehouse operation. The ODS module includes a bar code scanning feature that names, identifies, and tracks, each product through the warehouse operation. The radio frequency function module for the ODS provides for in-situ or real time tracking of each product, which has a label thereon, which provides signals to a receiver, which provides a geographical location of the product to the radio function module. Accordingly, the ODS module provides for many aspects of naming, identifying, and tracking product(s) through the warehouse operation.

The software also includes a freight management system module 3035 and a parcel shipping module 3037. The freight management system module performs general charges to the freight. The freight module can also calculate and apply freight charges to less than truck load ("LTL") shipments, and perform other functions. The parcel shipping module calculates shipping charges and creates a manifest. Freight charges are calculated upon a number of factors such as the size of the load, destination, insurance, priority of the shipment, and others.

Inventory management system ("IMS") module performs inventory tracking functions. As merely an example, the IMS module includes a receive function, a stock locator function, a cycle counting function, and a work order function through a distribution center. The receiving function allows a product to enter the warehouse operation. The receiving function creates a purchase order or advance ship notices, and assigns a bar code identifier on the product, which is printed out by way of an output device. The stock locator tracks products. The cycle counting function checks inventory counts based upon throughput information of the product. The work order function tracks products through the distribution center. The radio frequency module 3049 and the task management module 3047 work with the IMS module to track geographic location and process location, respectively, of the product in the warehouse operation through distribution.

The software can also include other modules such as the order allocation module 3045, an interface module 3041, and others 3043. The interface module allows the present process module to interface with other networks, including local and wide area networks. These networks allow a user to track a product throughout the warehouse operation, through the dock and yard, and thorough the fleet, using any one of a plurality of workstations that are coupled to the network. In the present embodiment, the warehouse management system updates and tracks a client's inventory at a warehouse. For example, the warehouse management system includes modules that tracks the quantity of each product, model number of each product, name of each product, number of days the product remains in the warehouse, unit cost per product, order requests, orders received, number of days before next shipment, product location describing the rack, shelf, level, location of the product in the warehouse, and the like. Other information related to warehouse management can also be tracked and included in the warehouse management system.

In addition to the warehouse management system, the present invention can also include a dock management system. The dock management system tracks work flow between the warehouse and the distribution center. In a specific embodiment, the dock management system tracks what airplane, ship, truck, or other transportation means is arriving at the airport, port, or factory. In addition, the dock management system provides information regarding the time of arrival of the transportation means, what products are located on the transportation means, and what dock number, airport, or station, the inventory is arriving at. The dock management system also provides the time the goods or products will be available for pick up. An example of a general warehouse management system is a product called PkMS™ made by a company called Manhattan Associates. An example of a general dock management system is called UltraYARD™ and is made by a company called RANDTEC. These examples should not limit the scope of the claims.

Figure 4A:
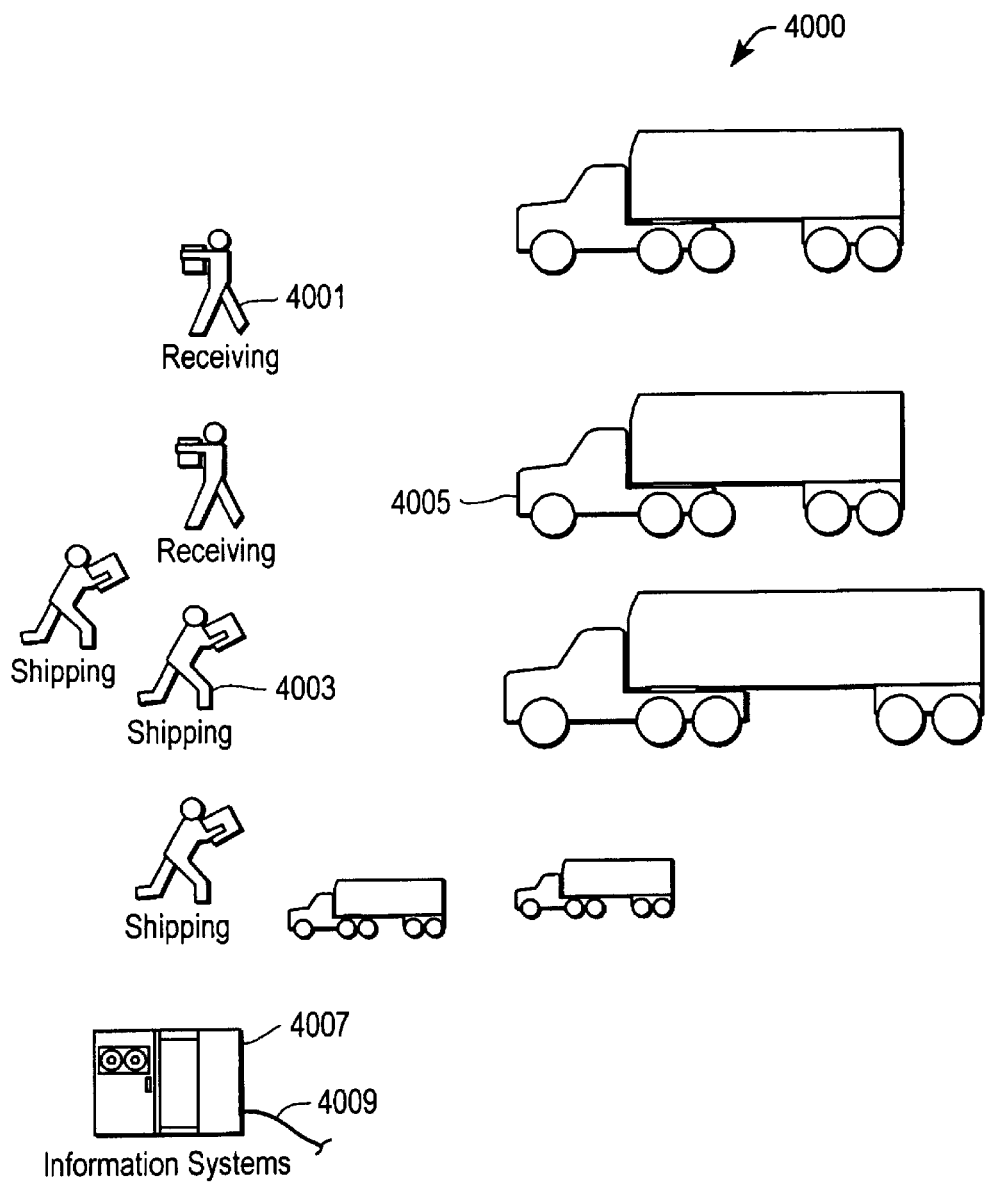
FIGS. 4A to 4B are simplified diagrams of yard management systems according to embodiments of the present invention.
Figure 4B:
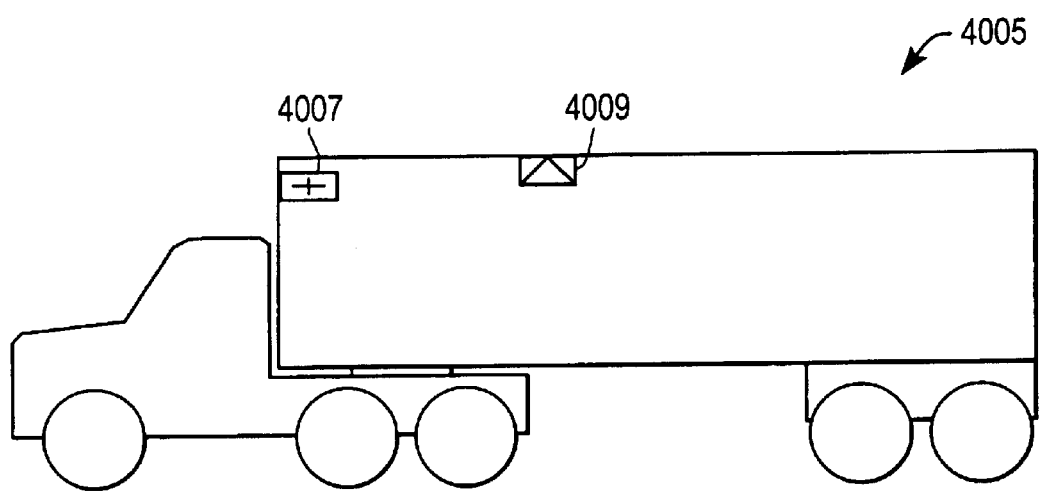

In a specific embodiment, a yard management system is provided. FIGS. 4A to 4B are simplified diagrams of yard management system 4000 according to embodiments of the present invention. These diagrams are merely examples and should not limit the scope of the claims herein. One of ordinary skill in the art would recognize other variations, modifications, and alternatives. A yard often includes a plurality of trucks or vehicles 4005, which are parked in many different locations and are often difficult to track. The yard has a dock, which has people for receiving 4001 product(s) or shipping 4003 product(s). A central system 4007 for managing the information about the product(s) can also be included. The central system is often networked 4009 by way of a network card or the like.

The central system tracks the location of each product by way of a mobile identification or tag, which is coupled to each truck, e.g., shipping, fork truck. The mobile tag is attached to the fork truck on the dock, which provides for tracking of each of the fork trucks. Additionally, the mobile tag is attached to each of the trucks in the yard. As merely an example, FIG. 4B illustrates a mobile tag on a tractor trailer combination 4005. The tractor trailer combination includes a radio frequency identification ("RFID") 4007 system or tag, which is physically attached to the truck or trailer. The RFID is used to monitor the geographic location of the truck. Here, a reader is attached to gates and other locations on the yard. The reader sees each RFID and identifies the geographic location of the truck. The reader is coupled to the central system which tracks the location of each truck in the yard. The reader communicates to the central system over a wireless interface. The interface between the system and the reader generally interface through a wireless local area network, but can also be connected via Ethernet or a serial interface, as well as others.

In some aspects, the mobile identifier also couples to a volumetric sensor 4009, which is placed within the truck trailer. The volumetric sensor can determine if the trailer is empty, partially full, or full. Additional features such as the door status, temperature, and other parameters can also be monitored with other tools. The volumetric sensor can use any suitable technology such as ultrasonic technology. An example of a volumetric sensor is made by a company called RANDTEC and is commonly called UltraCUBE™, but can be others. The sensor provides status information to the central system.

In general, the present yard management system tracks the location and/or the number of trucks in the factory or yard. In addition, the yard management system provides information such as the number of trucks parked in the lot, the number of trucks available for use, the number of trucks needing repairs, the size of the trucks, the number of trailers available, the size of the trailers, the storage capacity for each trailer, what trucks have taken what trailers, and what time each truck is leaving the yard. These and other features are tracked by way of the system, which is interconnected to a wide area network, which allows for product tracking at one of a plurality of displays or workstations.

In a specific embodiment, a fleet management system is provided. FIGS. 5A to 5D are simplified diagrams of fleet management systems according to embodiments of the present invention. These diagrams are merely examples and should not limit the scope of the claims herein. One of ordinary skill in the art would recognize other variations, modifications, and alternatives.

In describing the embodiments below, it may assist the reader in defining the abbreviated terms as follows:

| | |
|---|---|
| API | Application Program Interface |
| AVL | Automatic Vehicle Location |
| CAD | Computer Aided Dispatching |
| IPC | Inter-Process Communications |
| MDS | Mobile Data Suites |
| MDT | Mobile Data Terminals |
| MIC | Mobile Information Center |
| MIC-RUN | MIC Database Runtime Process |
| CMIC | Centralized Mobile Information Center |
| MPM | Main Process Manager |
| MID | Mobile Interchange Data |
| MTS | Mobile Tracking Station |

-continued

| | |
|---|---|
| TCP/IP | Transport Communication Protocol/Internet Protocol |
| TWM | Two-Way Messaging |
| SCB | System Controller Board |

These definitions are intended to assist the reader in understanding some of the present embodiments. They should, however, not limit the scope of the claims as defined herein. One of ordinary skill in the art would recognize other variations, modifications, and alternatives. In addition, other terms ordinary used in the art could even replace some of the aforementioned terms, depending upon the application.

Figure 5A:
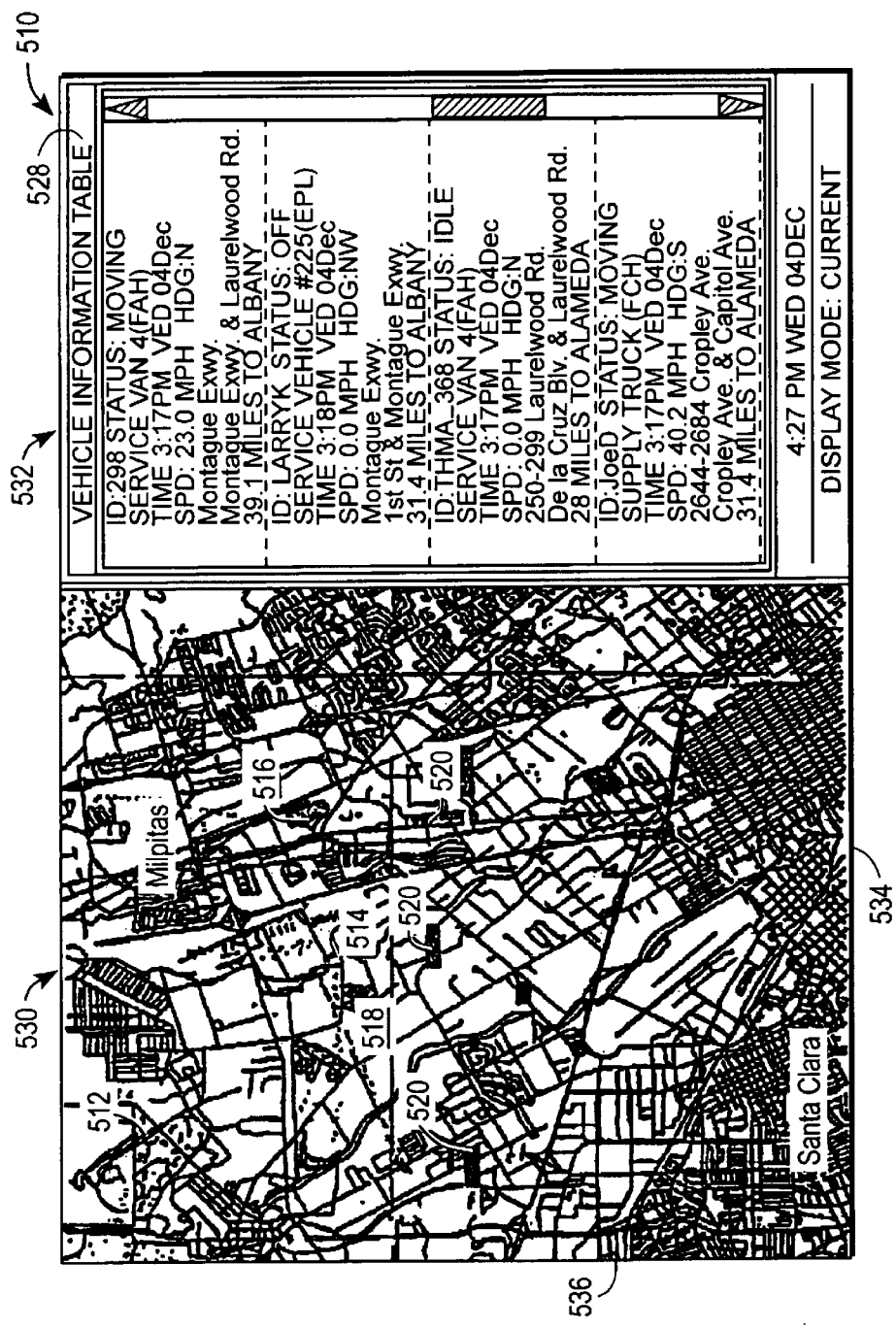
FIGS. 5A to 5D are simplified diagrams of fleet management systems according to embodiments of the present invention.

In a specific embodiment, the present invention provides a novel display. FIG. 5A illustrates an integrated raster map display according to an embodiment of the present invention. The raster map 510 includes natural features such as marshlands 512, creeks 514, and the like. The raster map 510 also includes manmade features such as the Auto Assembly Plant 516, Agnews Hospital 518, and others. The raster map is, for example, a digitally scanned road map, a digitally scanned automobile road map, a raster image in digital form, a pre-existing digital map without intelligent information, a digital map in TIFF format, a digitized video image, a digitized satellite image, or the like. Of course, the raster map can also generally be almost any type of digital map with substantially clear features without intelligent street information or the like.

Icons 520 show the position of the vehicles identified in the vector information table 528. But it will be recognized that the icons can also represent any mobile entities such as automobiles, vans, trucks, ambulances, animals, people, boats, ships, motorcycles, bicycles, tractors, moving equipment, trains, courier services, container ships, shipping containers, airplanes, public utility vehicles, telephone company vehicles, taxi cabs, buses, milk delivery vehicles, golf carts, beverage delivery vehicles, fire trucks and vehicles, hazardous waste transportation vehicles, chemical transportation vehicles, long haul trucks, local haul trucks, emergency vehicles, and the like. The icons can represent any mobile or potentially mobile entity or the like.

The vector information table 528 indicates selected geographic and cartographic information retrieved from, for example, the vector database. The vector information 528 provides intelligent street information such as block number, address information, nearest cross-section of major streets, and the like with reference to the vehicle position. The vector table can also provide information about vehicle speed, vehicle heading, an activity status, a time status, and the like.

The display shown in FIG. 5A can be divided into at least two regions or segments such as a raster display segment 530, a vector information display segment 532, and others. The raster display segment 530 includes a first and second axis 534, 536 representing the latitudinal and longitudinal position of the vehicle position, respectively. Alternatively, the raster display segment may be in cylindrical or polar coordinates, and may not be limited to two dimensions.

A digitized map of the region through which the vehicle travels is displayed in the first segment of the display 530, adjacent to the first and second axis 534, 536. As noted above, each vehicle is represented as an icon. The icons may be color coded relative to a status chart and the like. Of course, the shape and color of each icon depend upon the particular application.

In an alternative embodiment, the present display can include addition features such as those discussed in U.S. application Ser. No. 08/706,211 now U.S. Pat. No. 5,922,040, Ser. No. 08/697,825 now abandoned, and Ser. No. 08/706,341 now U.S. Pat. No. 5,904,727 filed on date of this application and assigned to the present assignee, which are hereby incorporated by reference.

Figure 5B:
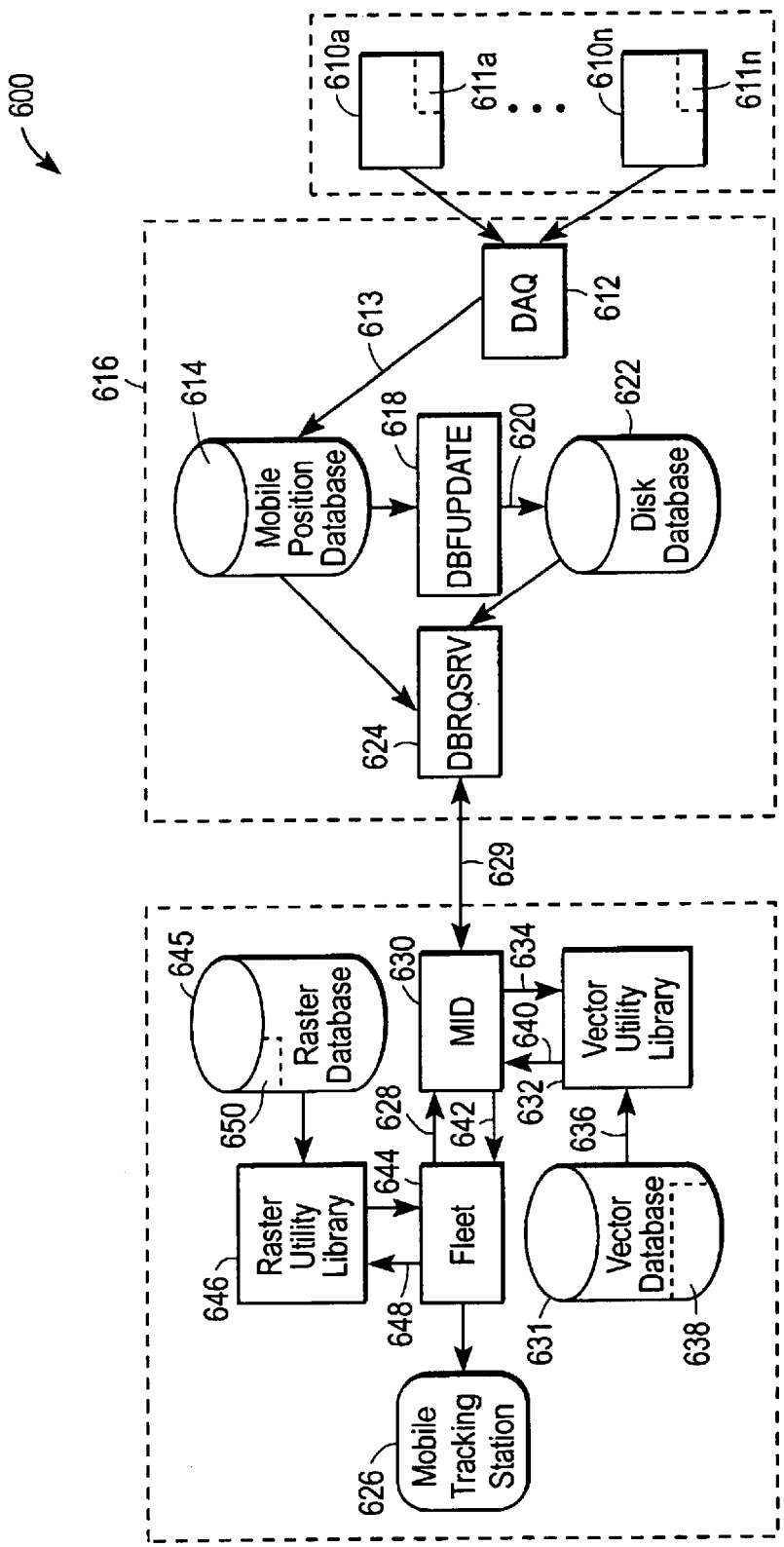
Figure 5C:
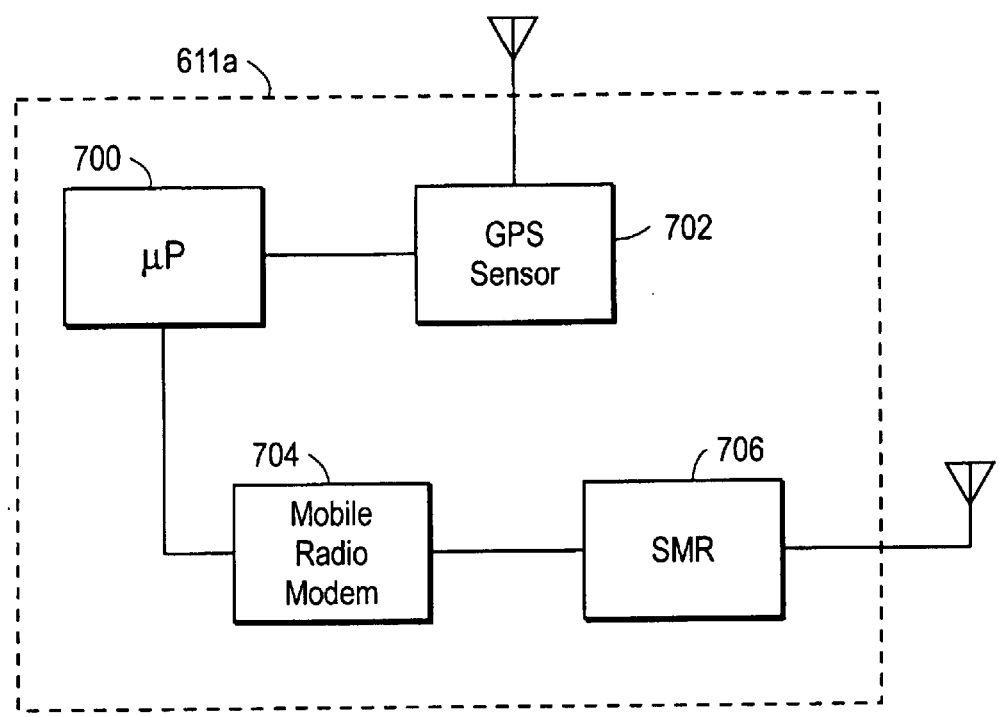

In a specific embodiment, the present invention includes a fleet management system. FIG. 5B illustrates a block diagram of the fleet tracking system 600 for automatic vehicle location according to the present invention. Each vehicle 610a–610n includes a navigational tracking device hereafter called a fleet mobile data suite (MDS) 611a–611n. The fleet MDS 611 includes a microprocessor-controlled circuit 700 coupled to a GPS navigational sensor 702, a mobile radio modem 704, and a specialized mobile radio (SMR) 706 operational in the 800–900 MHz frequency range, as illustrated by FIG. 5C. The fleet MDS 611 continuously compiles latitude and longitude position data from the GPS sensor. Latitude and longitude position data is periodically transmitted to the data acquisition system 612.

The mobile position block 616 processes vehicle location information typically on a UNIX based computer. Other computer such as Windows NT, DOS, MacOs, etc. based computer, for example, are also contemplated for alternative embodiments of the present invention. The mobile position block 616 includes a data acquisition system 612, a mobile position database 614, a UNIX process DBFUPDATE 618, a disk database 622, and a UNIX process DBREQSRV 624. The data acquisition system 612 includes a personal computer coupled to both a base data link controller, and a specialized mobile radio (SMR) operational in the 800–900 MHz frequency range. The data acquisition system 612 receives latitude and longitude position data from the fleet MDS 611, attaches a vehicle identifier to the navigational position data, and transmits the data block 613 (vehicle identification, latitude, longitude) to the mobile position database 614. Vehicle position is defined in terms of a latitude and longitude value during a predetermined time period.

The UNIX process DBFUPDATE 618 scans the mobile position database 614, preferably every 5 seconds, for any new information from the fleet MDS. The new data 620 is permanently stored in the disk database 622 for subsequent retrieval of historical information. Another UNIX process DBREQSRV 624 processes requests by the user from the mobile tracking station 626 for navigational position information. The mobile tracking station 626 can be a high resolution color UNIX workstation. User requests 628 are originated by mobile information data process 630, a UNIX process running on the mobile tracking station 626.

The mobile information data process 630 receives latitude and longitude position data for a particular vehicle. The mobile information data process 630 accesses the vector database 631 using the vector utilities 632. The vector utilities 632 match the latitude and longitude position information 634 to the latitude and longitude of street segment information 636 from the vector database 631. In addition, the vector utilities 632 match the latitude and longitude position information 634 to the latitude and longitude information of the cross-section of major streets 636 in the cross-section vector database 638. The cross-section vector database 638 can be a subsection of the vector database 631.

The nearest matching street segment, its street name and block number range, and the nearest cross-section of major streets, and its street name 640 are transmitted to the mobile information data process 630. The mobile information data process 630 attaches the street text information to the mobile position information and sends this data packet 642 to the fleet process 644.

The fleet process 644, a UNIX based process or the like, is the user interface display process. The fleet process 644 receives mobile position information and street text information from the mobile information data process 630. In addition, the fleet process 644 accesses the raster database 645 through the raster map utilities 646.

The raster map utilities 646 match the latitude and longitude mobile position 648 from the fleet MDS 611 to the various digitized raster maps data 650 in the raster map database 645. By specifying the zoom level option, using as an example, the X11/Motif graphical user interface on the mobile tracking station 626, the digitized raster map is displayed in one display window segment 530 and the corresponding street text information on another display window segment 532. A user locatable mark 520 represents the fleet MDS position for a particular vehicle. The icon 520 is positioned at the corresponding latitude and longitude location on the raster map display 530.

Historical data requests may be made by specifying a particular time period and a particular fleet MDS 611. The data request is sent by the fleet process 644 to the mobile information data process 630. The mobile information data (MID) process 630 in turn sends a request 628 to the DBRQSRV 624 process. The DBRQSRV 624 process accesses the disk database 622 and retrieves reports for the specific time period and fleet MDS 611. For every historical report sent back to the MID process 630, the above described process flow for accessing and displaying the raster map, vector street information, and displaying the user locatable mark representing the position of the navigational system is followed.

The vehicle display system includes at least three databases (a mobile position database 614, a raster database 645 and a vector database 631). The database information is interrelated by common latitude and longitude position data. A mobile tracking station 626 displays the position, raster and vector information in a format easily understood by the dispatcher or fleet manager.

The first database, the mobile position database 614, is a positional information database for storing vehicle position information received from the navigation systems. Navigational data transmitted from systems such as LORAN and GPS (Global Positioning System) is stored into data records indicating the latitude and longitude of a particular vehicle during a predetermined time interval. The DAQ process 612 is used to format position data received from the navigational system into the mobile position database 614. The vehicle identification is used as locator field to access the database for a particular vehicle. Vehicle position data is stored related to the vehicle identifier.

The second database, the raster database 645, is generated by digitally scanning a standard road map or paper map. The raster database 645 contains a digitized version of the visual features of the land for a specified region. Digitized raster information is stored in the raster database 645 in data records. Each data record corresponds to a digitized region having a particular latitude and longitude value. The latitude and longitude values are used as a locator field for accessing the raster database 645.

Data from both the raster database 645 and the mobile position database 614 are used in displaying the raster map and icon 520 in the first segment 530 of the display shown in FIG. 5A. The fleet process 644 in combination with the raster map utilities 646, MID process 630, and vector map utilities 632 contains routines to access the mobile position database 614 and the raster map database 612. Both the mobile position database 614 and the raster map database 645 include a latitude and longitude field identifier. The raster map utility 646 in combination with the fleet process 644 and MID 630 matches the longitude and latitude values from the mobile position database 614 and the raster map database 645 and displays an icon 520 (representative of a particular vehicle) moving along the raster map as it changes its latitude and longitude position. The icon 520 moves according to the navigational data extracted from the mobile position database 614 for a particular vehicle. The icon 520 is also displayed in the first display segment 530. Since the latitude and longitudinal position of the icon 520 corresponds to a street location, the icon 520 moves along a particular street on the raster map display 530.

However, because the raster map is merely a digitized representation of the street, no interrelationship between different street locations or landmarks exists and intelligent street information is not displayed. A third database, the vector database 631, is needed to provide intelligent street information.

Vector address data and street information is publicly available from the US Census Bureau. The US Census provides GBF/DIME (Geographic Base Files/Dual Independent Map Encoding) files which are a common source of address data for dispatching applications. These files contain information describing the street network and other features. Each field record contains the segment name, address range and ZIP code. Node numbers for intersections are referenced to the vehicle latitude and longitude coordinate position.

A third database the vector database 631, contains vector information provided from GBF/DIME files. Vector information is displayed in the second display segment 532. The vector information displayed in segment 532 is typically displayed as text and relates intelligent street information corresponding to the latitude and longitude of a particular vehicle. Display segment 532 of FIG. 5A represents the vector text information.

The MID process 630 contains routines to access the mobile position database 614. Both the mobile position database 614 and the vector map database include a latitude and longitude field identifier. The vector utility 632 in combination with the MID process 630 contains routines to extract block number, street name, cross-section of major streets and other address related information and to match the longitude and latitude values from the mobile position database 614 to the vector map database 632. The mobile tracking station 626 displays the vehicle position on a raster map and corresponding address information simultaneously.

The steps for display of the integrated system include defining a coordinate system having a first axis representing the latitude of the vehicle position and a second axis representing the longitude of the vehicle position. Digitized information representative of a raster map is extracted from the raster database 645 and displayed adjacent to the first and second axes to form a raster map of a first predefined area.

Mobile position data from the GPS navigation system corresponding to vehicle latitude and longitude position during a predetermined time interval is extracted from the mobile position database 614. A user locatable mark 520 in the first display segment 530 corresponding to the latitude and longitude of the vehicle position is displayed. Intelligent street information is extracted from a third database, the vector database 631. Vector text information is displayed in a second segment 532 of the display. The vector text information corresponds to the latitude and longitude of the user locatable mark 520.

Figure 5D:
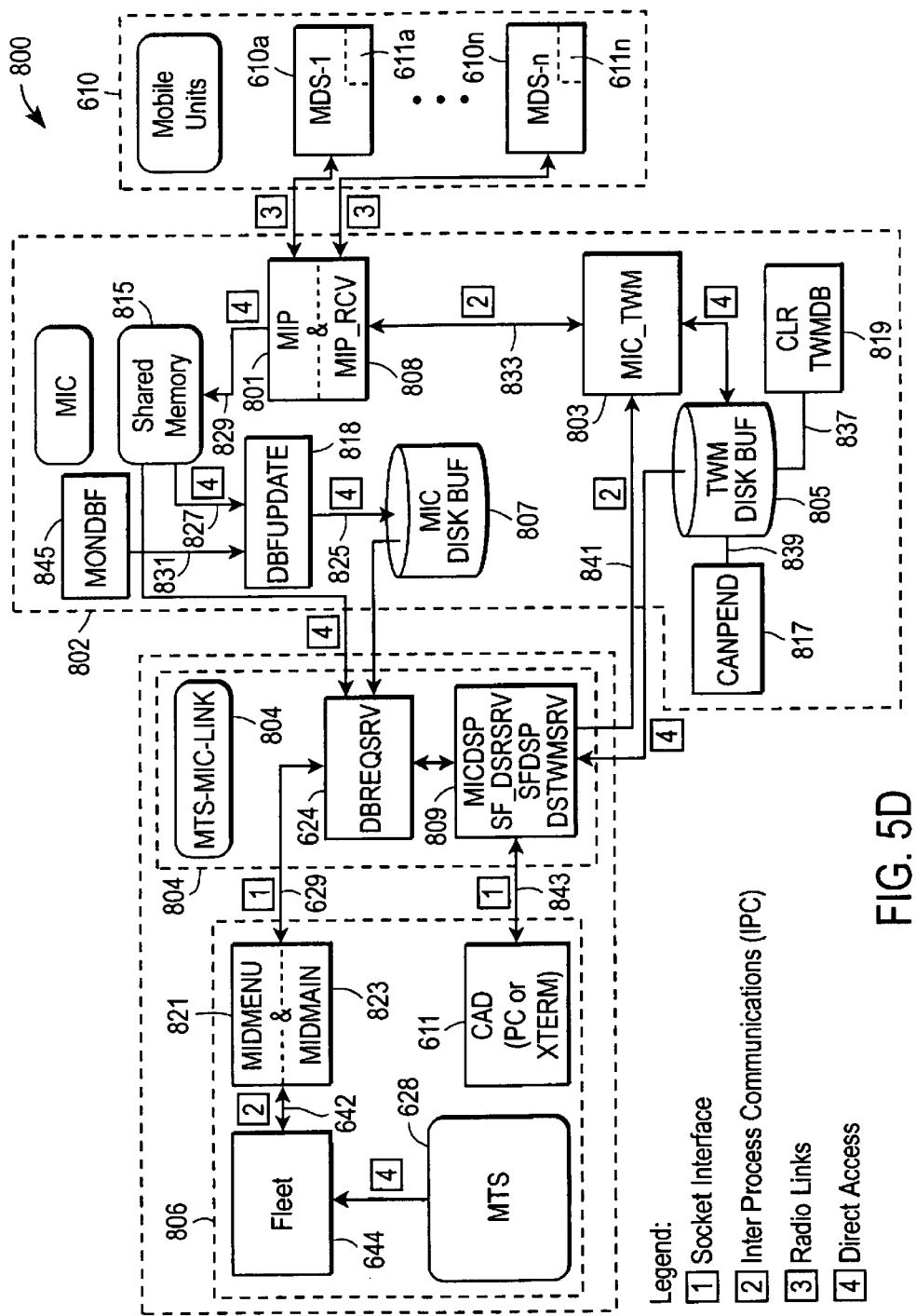

FIG. 5D illustrates a simplified block diagram 800 of an integrated raster map display and information display according to an alternative embodiment of the present invention. The block diagram is merely a simplified illustration and should not limit the scope of the claims as defined herein. The block diagram provides functions for accessing mobile information center (MIC) databases and servers to handle sub-systems such as an automatic vehicle location (AVL) system, a two-way messaging (TWM) system, a computer aided dispatch (CAD) system, and others. The simplified block diagram includes fleet mobile units 610, a mobile information center (MIC) 802, a mobile tracking system-mobile information center link (MTS-MIC LINK) 804, a mobile tracking system 806, among other features.

The mobile tracking system 806 includes system elements such as a mobile tracking station 626, a fleet process 644, a computer aided dispatch system 811, a mobile information data menu (MIDMENU) 821, a mobile information data main process (MIDMAIN) 823, and other elements. The mobile tracking system provides functions similar to the previous embodiment, but also has the computer aided dispatch system 811 and other elements. Selected system elements from the previous embodiment such as the mobile information data process 630, raster utility library 646, raster database 645, vector database 631, vector utility library 632 are combined within the MIDMENU & MIDMAIN 821, 823 process (hereinafter collectively "MIDMAIN"). A UNIX process such as the DBREQSRV 624 processes requests by a user from the mobile tracking station 626 for navigational position information. The mobile tracking station 626 can be any suitable high resolution color UNIX workstation or the like. User requests 628 originate at the MIDMAIN 821, 823 process which is a UNIX process running on the mobile tracking station 626.

The MIDMAIN 821, 823 process receives latitude and longitude position data for a selected mobile unit MDS-1 to MDS-n via line represented as 629. The MIDMAIN 821, 823 process accesses the vector database (or memory) 631 using the vector utilities. The vector utilities match the latitude and longitude position information to the latitude and longitude of street segment information from the vector database. The vector utilities also match the latitude and longitude position information to the latitude and longitude information of the cross-section of major streets in the cross-section vector database. The cross-section vector database is a subsection of the vector database, all within the MIDMAIN 821, 823 process or the like.

The MIDMAIN 821, 823 process via vector utility library retrieves the nearest matching street segment, its street name and block number range, and the nearest cross-section of major streets, and its street name and other information. The MIDMAIN 821, 823 process via mobile information data process attaches the street text information to the mobile position information and defines such information as a data packet or the like. The MIDMAIN 821, 823 process sends the data packet over a line represented as 642 to the fleet process 644.

The fleet process 644 is a user interface display process. The fleet process can be any suitable user interface display process such as a UNIX process or the like. The fleet process 644 receives mobile position information and street text information from the MIDMAIN 821, 823 process. The fleet process 644 accesses via line represented as 642 the raster database (or memory) through the raster map utilities, all in the MIDMAIN 821, 823.

The raster map utilities match the latitude and longitude mobile position from the fleet mobile units to the various digitized raster maps data in the raster map database. By specifying the zoom level option, using for example the X22/Motif graphical user interface on the mobile tracking station 626, the digitized raster map is displayed in one display window segment 530 and the corresponding street text information on another display window segment 532. A user locatable mark 520 (or icon) represents the fleet mobile units position for a particular vehicle. The icon 520 is positioned at the corresponding latitude and longitude location on the raster map display 530.

The display system includes at least three databases or memory locations and the like (a mobile position database 614, a raster database 645, and a vector database 631). The database information is interrelated by common latitude and longitude position data. The mobile tracking station 626 displays the position, raster and vector information in a format easily understood by the dispatcher or fleet manager. For example, the raster information includes a graphical representation of the raster map and icons graphically depict locations of the fleet mobile units on such raster map. Vector information is superimposed onto the raster map to provide intelligence. Other functions of the vehicle display system are similar to the previous embodiment.

In the fleet mobile units, each vehicle 610*a*–610*n* includes a navigational tracking device, hereinafter called a fleet mobile data suite (MDS-1 to MDS-n) 611*a*–611*n*. Each fleet MDS 611*a*–611*n* includes elements such as a microprocessor-controlled circuit coupled to a GPS navigational sensor and the like, a mobile radio modem, and a specialized mobile radio (SMR) operational in, for example, the 800–900 MHz frequency range. But it would be recognized that the specialized mobile radio may be any type of wireless communication means such as cellular telephone, frequency modulated (FM) carrier means, cellular digital packet data means (CDPD), satellite communication, wide area wireless communication network (WAN) such a product called Ricochet(TM) sold by Metriof Los Gatos, Calif., and others. The mobile radio modem can also be a data modem, PCMCIA card modem, or the like for transporting data signals, voice signals, video signals, and the like. The fleet MDS 611*a*–611*n* compiles latitude and longitude position data from GPS sensors in a continuous manner and the like. Latitude and longitude position data are periodically transmitted at for example 5 minute increments or less to the mobile information center 802 block.

The automatic vehicle location system provides for vehicle tracking by way of selected elements from the fleet mobile units, the mobile information center, and other elements. The automatic vehicle system includes elements such as a UNIX DBFUPDATE server 618, a UNIX DBREQSRV server 624, a data acquisition and messaging interchange module (MIP or messaging interchange module) 801, a data acquisition and messaging interchange module and receive module (MIP RCV) 808, a monitoring process (MONDBF) 813, and others. Also shown are a shared memory 815, a mobile information center (MIC) disk buffer 807, and other elements. Of course other types of servers and elements may be used depending upon the particular application.

In the automatic vehicle location system, the UNIX DBFUPDATE server 618 monitors the shared memory 815 via line represented as 827 for any new reports or updated reports. The UNIX DBFUPDATE server 618 transfers the reports from the shared memory 815 to the mobile information center disk buffer 807 in a periodic manner via line represented as 825. The reports include information such as a time, a vehicle location, a driver name, a vehicle number, a vehicle speed, a vehicle status, and others. The UNIX DBFUPDATE server 618 uses memory and file locking protocols to access data from the shared memory 614. The UNIX DBFUPDATE server 618 process runs continuously, transferring reports in data form from the shared memory 815 to the mobile information center disk buffer 807.

The shared memory 815 can be a dynamic random access memory which can store up to about 50 or less reports per vehicle. Accordingly, it is important that the data in shared memory 815 be transferred to the mobile information center disk buffer 807 before the shared memory fills up with data. For example, vehicles reporting every minute fill up the shared memory 815 in about 50 minutes or less, and the new data coming into the shared memory can be overwritten. Of course, as dynamic random access memory capacity increases, more reports can be stored in the shared memory 815.

The UNIX DBRQSRV 624 server processes requests from login to logoff from the automatic vehicle location subsystem, and in particular a workstation. The workstation can be any suitable workstation of sufficient memory and processing means to handle data as described herein. The UNIX DBRQSRV 624 server also forks out a copy of its process upon connection on a socket. The fork out process verifies login information and processes requests from each workstation. The UNIX DBRQSRV 624 server also provides for a different (or second) communication channel with the use of a computer aided dispatch (CAD-type) messages as will be described in more detail below. Other functions of the UNIX DBRQSRV were described in the previous embodiment.

An interface between fleet mobile units 610 and mobile information center disk buffer 807 is provided by the messaging interchange process (MIP) 801. In particular, vehicle position reports from the mobile units 610 are transferred to the shared memory 614 via line represented as 829. The UNIX DBFUPDATE server transfers the vehicle position reports into the mobile information center disk buffer 807 via line represented as 827. As previously noted, the vehicle position reports include at least latitude and longitude information at a selected time and the like.

The MIP RCV process 808 assistants (or is an assistant) the messaging interchange process 801. In particular, the MIP RCV process 808 receives data from the messaging interchange process 801 and processes the data to determine a forwarding path. For example, some data are sent back to the messaging interchange module 801 for forwarding to the fleet mobile unit(s) 610, and other data go into the shared memory 815 and/or the two way messaging disk buffer 805, among other elements. Of course, the MIP RCV may also forward data to other elements of the mobile information center, mobile tracking station, and the like.

The automatic vehicle location system also includes the monitoring process such as the MONDBF 813 and the like. The MONDBF 813 is often dormant but periodically wakes up and checks the DBFUPDATE process 618 via line represented as 831. If the DBFUPDATE process 618 is not running, the MONDBF 813 outputs a warning message to an output device such as a screen or a printer, typically in standard UNIX shell script language or the like. The warning message alerts a user and appropriate action such as maintenance of the system or the like occurs. Of course, other forms of monitoring processes and/or systems may also be used depending upon the particular application.

The two-way messaging system provides for two-way messaging between the fleet mobile units 610 and, for example, a dispatcher or the like. The two-way messaging system is a "dumb" messaging system for communicating voice, data, video, and the like information between the fleet mobile units and the dispatcher and the like. The two-way messaging system includes elements such as a mobile information center two-way messaging module (MIC TWM) 803, a UNIX server 809, a CANPEND process 817, a CLRTWMDB process 819, and others.

A message such as a two-way message and the like from one of the fleet mobile units goes to the MIC TWM process from the message interchange module 801 via line represented as 833. A message from a dispatcher goes to the fleet mobile units through the MIC TWM module (or process) 803 through the messaging interchange module 801 via lines represented as 841 and 833. The MIC TWM module provides an interface between the dispatcher and the fleet mobile units 610 for two-way messaging. The MIC TWM module also has write access to a two-way messaging (TWM) database 805 and other memory devices via line represented as 835. The MIC TWM module has read access to the two-way messaging database 805 and other memory devices via line represented as 835. The MIC TWM module also records in-coming (fleet mobile units to mobile information center) and outgoing (mobile information center to fleet mobile units) messages in the two-way messaging disk buffer or the like. The MIC TWM module creates queues for communication between the messaging interchange 801 module, the UNIX DBTWMSRV server 809, and any other two-way messaging module, and is often started first in the two-way messaging system.

The CANPEND module 817 cancels pending messages via line represented as 839. Pending messages may be defined as messages sent to vehicles that are turned "off" or messages that need "acknowledgment" which are queued up as "pending" until they are delivered or acknowledged. The CANPEND module 817 reduces the likelihood of messages being piled up or the like. The CANPEND module 817 is preferably activated periodically to automatically cancel pending messages and the like. The canceled messages are stored in the TWM disk buffer 805, and can be viewed via a HISTORY DATA option, but the status is preferably displayed as "canceled" in a selected display device.

The CLRTWMDB module (or process) 819 clears the two-way messaging disk buffer of incomplete message transactions in the event that the messaging interchange process 810 or the MIP RCV 808 process is restarted. The CLRTWMDB module 819 clears status prompts such as message sent or message fail and other types of status prompts from the two-way messaging disk buffer, and leaves the messages as pending. The CLRTWMDB process 819 is often executed before the messaging interchange module process, but can also be executed at other times.

The computer aided (CAD) dispatch process provides dispatching for the fleet mobile units from the dispatch office. The computer aided dispatch process includes servers 809 such as a MICDSP server, a UNIX SF DSPSRV server, a SFDSP server, and others. The computer aided dispatch also includes a system 811 (or module). The system or module can be any suitable computer aided dispatch software and hardware combination or the like.

The MICDSP server defines an interface to the CAD process 811 and other system elements such as the mobile tracking station 626, the fleet mobile units 610, and the like. The MICDSP server translates data coming from the CAD system 811 via line represented as 843 and formats the data into the mobile information center system specifications or the like. The MICDSP server passes data to the SF DSPSRV process, a UNIX socket level interface process or the like.

The SF DSPSRV server provides an interface between the MICDSP server and the SFDSP server. The SF DSPSRV server deciphers different types of CAD messages and routes them to either the SFDSP or DBREQSRV servers. Messages from the fleet mobile units are sent to SFDSP server, while display and driver status type of messages are sent to the MTS station via the DBRQSRV process.

The SFDSP module provides a connection to the two-way messaging disk buffer for a store-n-forward mechanism. The SFDSP provides socket connection to the DBTWMSRV process and sends CAD messages via the two-way messaging disk buffer to the fleet mobile units. Statuses are returned to the CAD system by the fleet mobile data units via the SFDSP process. The SFDSP process also reads the SUPERUSR account information of the fleet mobile units at start-up time via a login packet transaction.

In a specific embodiment, the present invention also provides a package tracking system. The package tracking system includes a system for tracking packages. A package can be tracked at any time. The package tracking system provides information regarding the location of the package, the time the package left a particular location such as a warehouse, and the time the package will arrive at a particular location. In addition, information regarding the anticipated time of delivery and anticipated time of pickup are also provided. The package tracking system also provides a technique for determining an efficient route between required stops.

While the invention has been described with reference to the illustrated embodiment, this description is not intended to be construed in a limiting sense. For example, the computer platform used to implement the above embodiments include 586 class based computers, Power PC based computers, Digital ALPHA based computers, SunMicrosystems SPARC computers, etc.; computer operating systems may include WINDOWS NT, DOS, MacOs, UNIX, VMS, etc.; programming languages may include C, C++, Pascal, an object-oriented language, etc. Various modifications of the illustrated embodiment as well as other embodiments of the invention will become apparent to those persons skilled in the art upon reference to this description. In addition, a number of the above processes could be separated or combined and the various embodiments described should not be limiting. It will be understood, therefore that the invention is defined not by the above description, but by the appended claims.

In summary, a novel technique has been described for combining pre-existing systems with present systems using interface tools. While the invention has been described with reference to the illustrated embodiment, this description is not intended to be construed in a limiting sense. Various modifications of the illustrated embodiment as well as other embodiments of the invention will become apparent to those persons skilled in the art upon reference to this description. It will be understood, therefore that the invention is defined not by the above description, but by the appended claims.

Attorney Docket No. 015517-001820US

APPENDIX

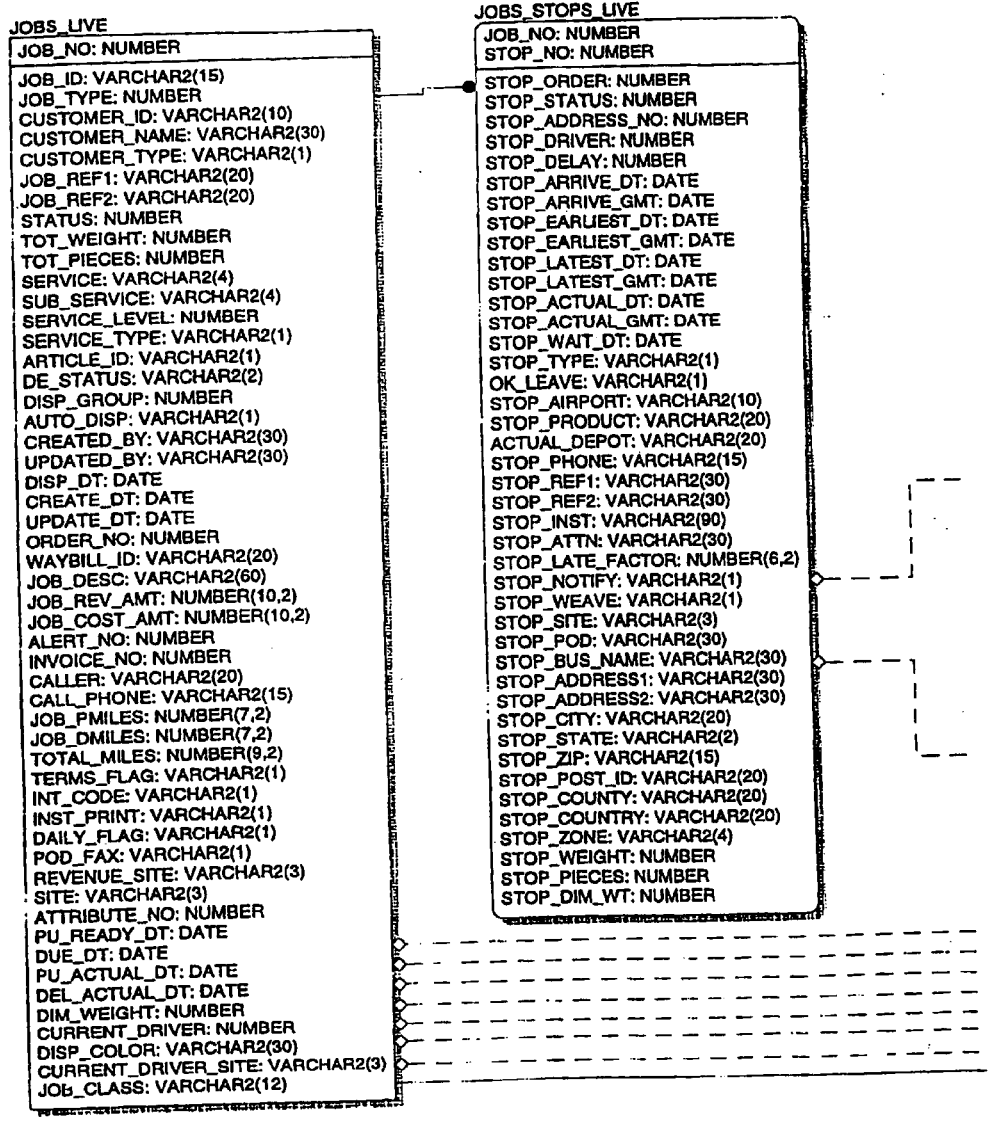

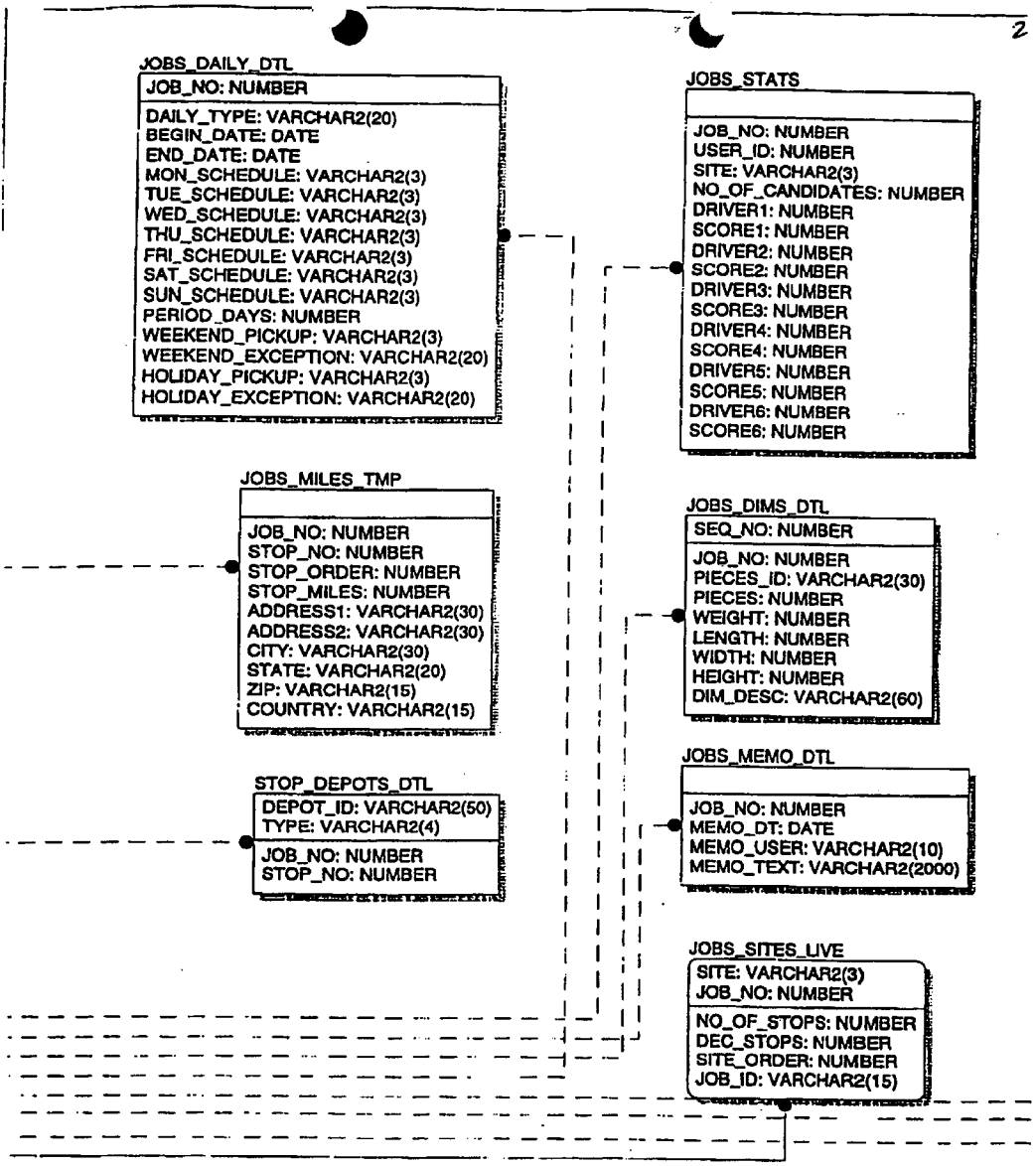

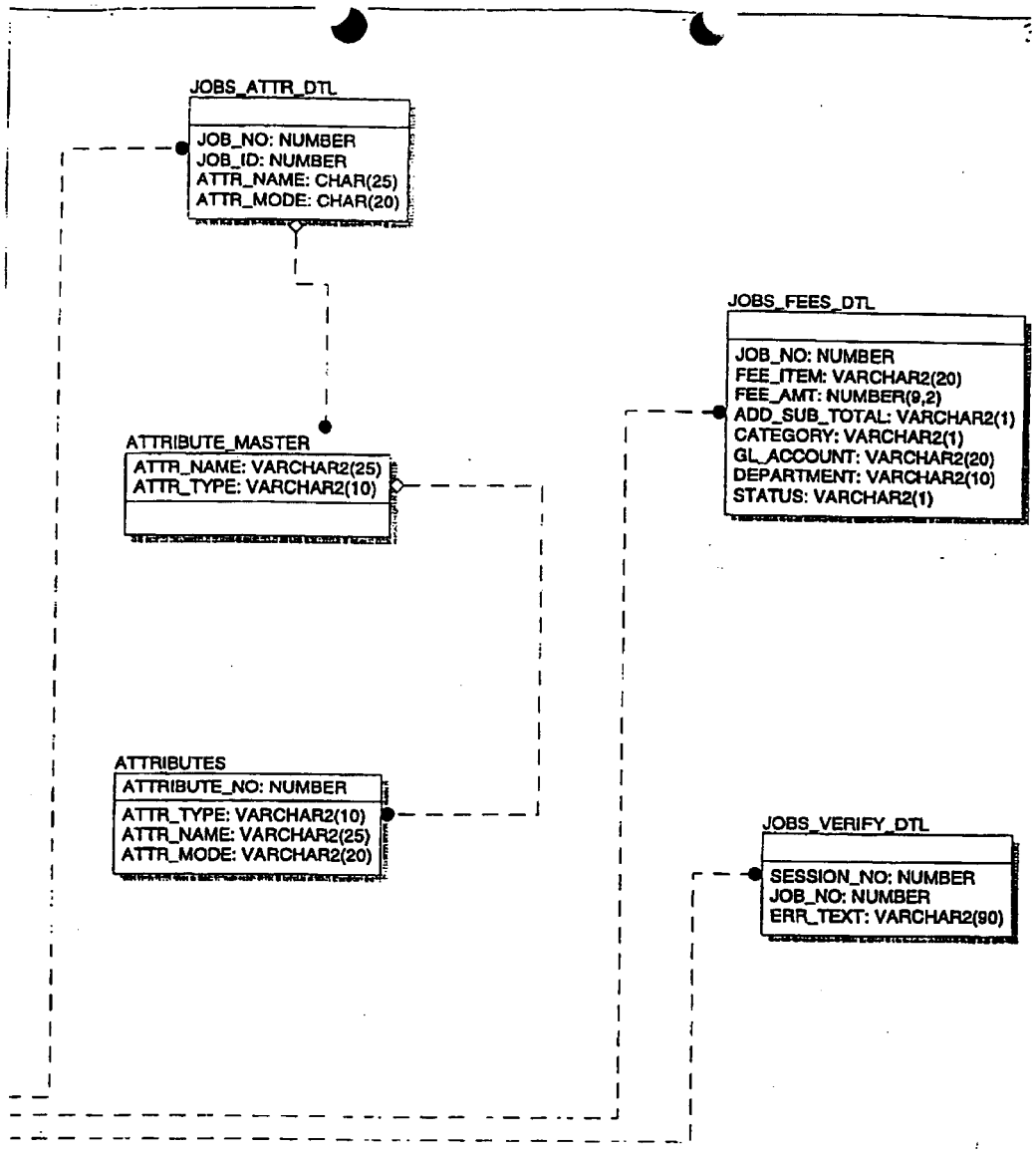

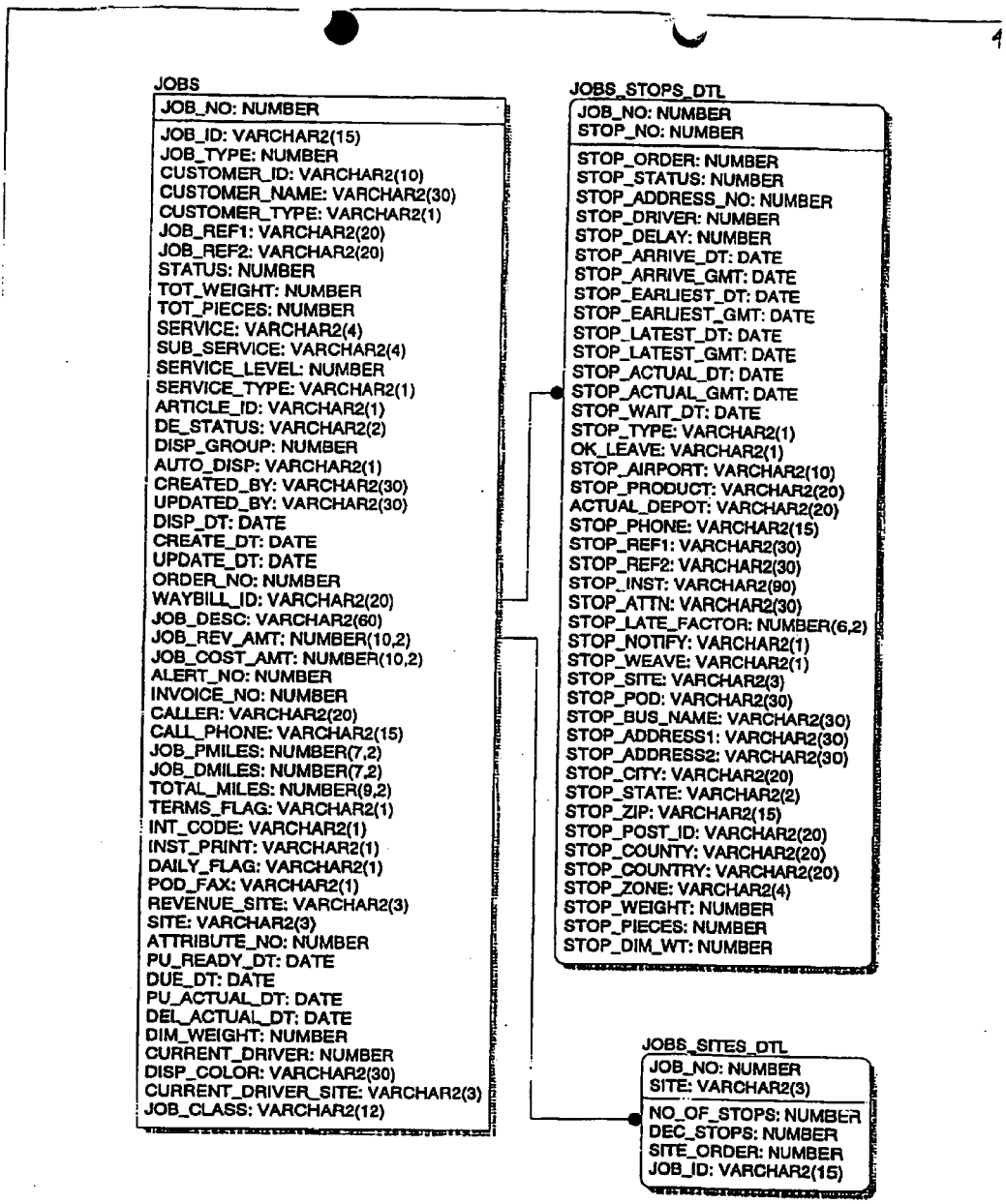

DRIVERS_SHIFTS_DTL
SHIFT_NO: NUMBER

DRIVER_NO: NUMBER
LOGON_STREET: VARCHAR2(30)
LOGON_CITY: VARCHAR2(20)
LOGON_STATE: VARCHAR2(2)
LOGON_ZIP: VARCHAR2(10)
LOGON_COUNTRY: VARCHAR2(3)
LOGON_LAT: NUMBER(14)
LOGON_LONG: NUMBER(16)
LOGOFF_STREET: VARCHAR2(30)
LOGOFF_CITY: VARCHAR2(20)
LOGOFF_STATE: VARCHAR2(2)
LOGOFF_ZIP: VARCHAR2(10)
LOGOFF_COUNTRY: VARCHAR2(3)
LOGOFF_LAT: NUMBER(14)
LOGOFF_LONG: NUMBER(16)
AWAY_FROM_HOME: VARCHAR2(1)
PREFZONE: NUMBER
INZONE_ADVANTAGE: NUMBER
OUTZONE_PENALTY: NUMBER
SITE: VARCHAR2(3)
SHIFT_START_TIME: DATE
SHIFT_END_TIME: DATE
VEHICLE_GROUP_NO: NUMBER
NOTE: VARCHAR2(30)
EARLY_START_OFFSET: NUMBER
LATE_START_OFFSET: NUMBER
SHIFT_DATE: DATE
SHIFT_END_CUM_HOURS: NUMBER
SHIFT_TYPE: VARCHAR2(1)
REQ_SHIFT_START: DATE
REQ_START_LAT: NUMBER(14)
REQ_START_LONG: NUMBER(16)
REQ_SHIFT_END: DATE
REQ_END_LAT: NUMBER(14)
REQ_END_LONG: NUMBER(16)
ORIGINATOR: VARCHAR2(20)
EDIT_DT: DATE
ATTRIBUTE_NO: NUMBER

DRIVERS_SHIFTS_TPL
TEMPLATE_NO: NUMBER

DRIVER_NO: NUMBER
LOGON_STREET: VARCHAR2(30)
LOGON_CITY: VARCHAR2(20)
LOGON_STATE: VARCHAR2(2)
LOGON_ZIP: VARCHAR2(10)
LOGON_COUNTRY: VARCHAR2(3)
LOGON_LAT: NUMBER(14)
LOGON_LONG: NUMBER(16)
LOGOFF_STREET: VARCHAR2(30)
LOGOFF_CITY: VARCHAR2(20)
LOGOFF_STATE: VARCHAR2(2)
LOGOFF_ZIP: VARCHAR2(10)
LOGOFF_COUNTRY: VARCHAR2(3)
LOGOFF_LAT: NUMBER(14)
LOGOFF_LONG: NUMBER(16)
AWAY_FROM_HOME: VARCHAR2(1)
PREFZONE: NUMBER
INZONE_ADVANTAGE: NUMBER
OUTZONE_PENALTY: NUMBER
SITE: VARCHAR2(3)
SHIFT_START_TIME: DATE
SHIFT_END_TIME: DATE
DAY_OF_WEEK: NUMBER
VEHICLE_GROUP_NO: NUMBER
NOTE: VARCHAR2(30)
EARLY_START_OFFSET: NUMBER
LATE_START_OFFSET: NUMBER
ATTRIBUTE_NO: NUMBER

DRIVERS_SHIFTS_BRKS_DTL

SHIFT_NO: NUMBER
EARLIEST_BREAK_START: NUMBER
LATEST_BREAK_START: NUMBER
DURATION: NUMBER
REQ_BREAK_START: NUMBER
NOTE: VARCHAR2(30)

DRIVERS_SHIFTS_BRKS_TPL

TEMPLATE_NO: NUMBER
EARLIEST_BREAK_START: NUMBER
LATEST_BREAK_START: NUMBER
DURATION: NUMBER
NOTE: VARCHAR2(30)

© COPYRIGHT MOBILE INFORMATION SYSTEMS, INC. 1998

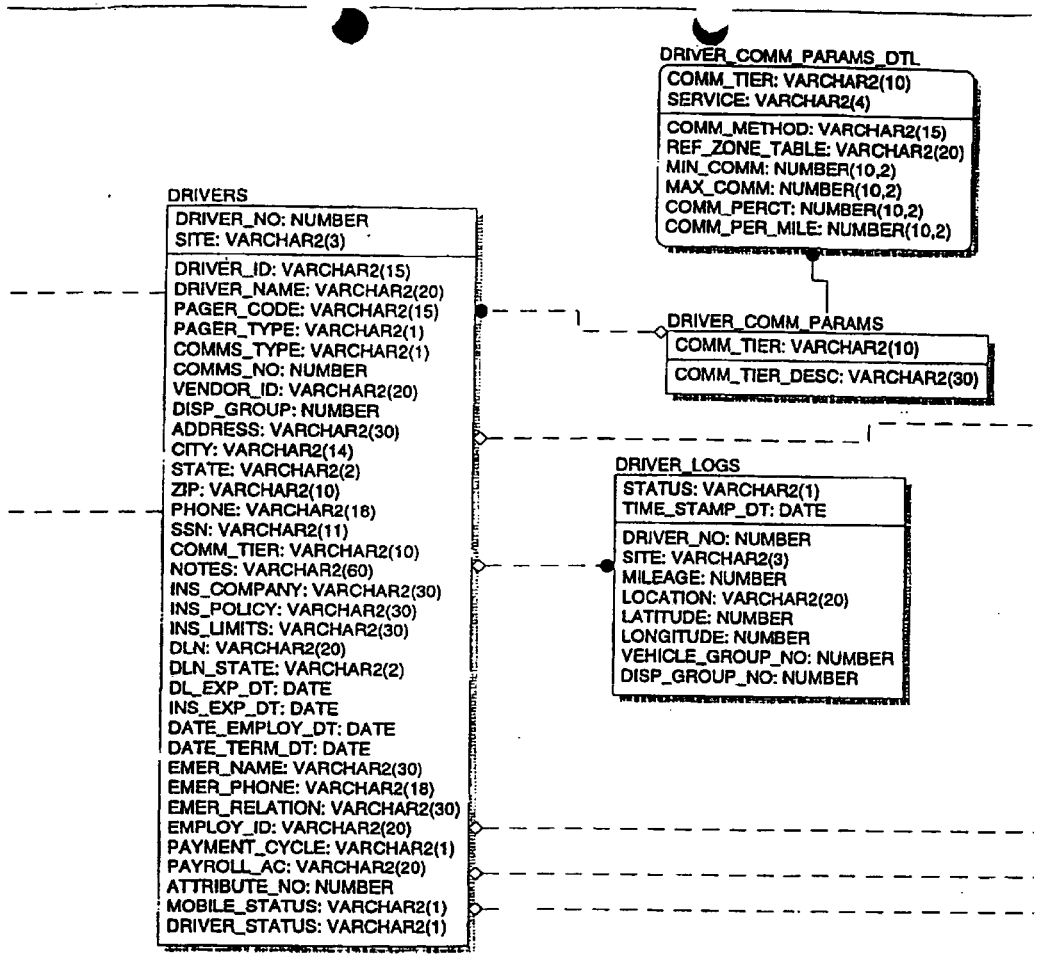

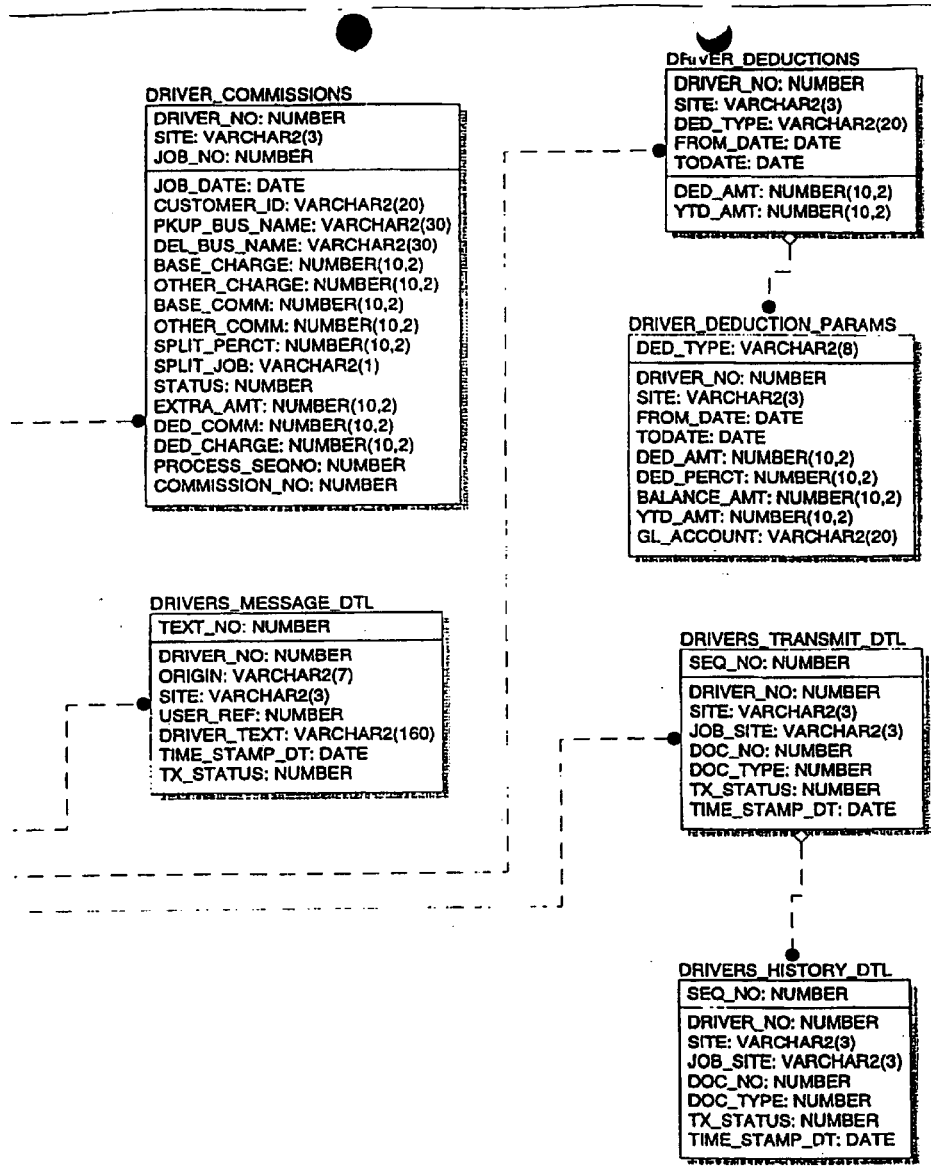

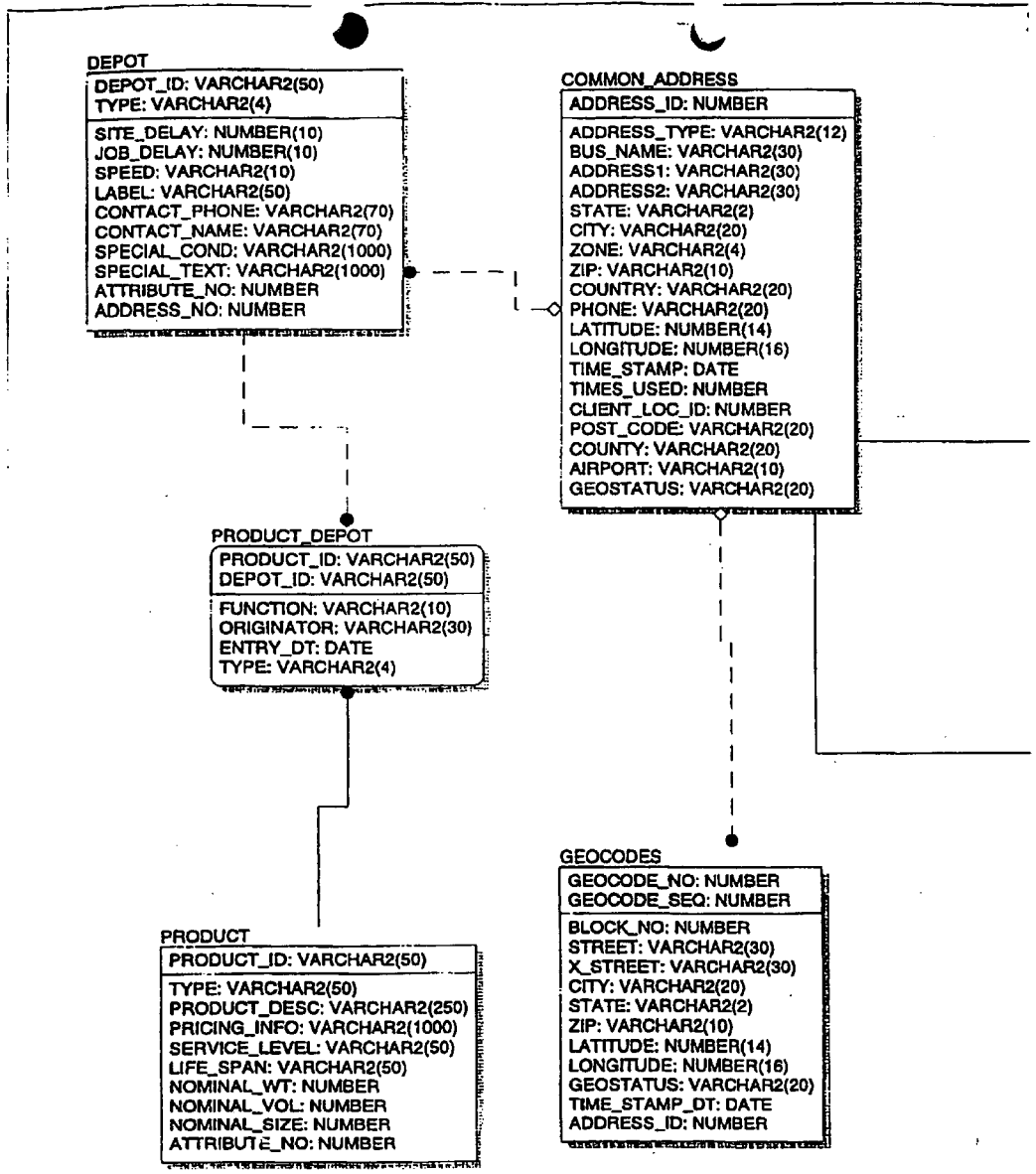

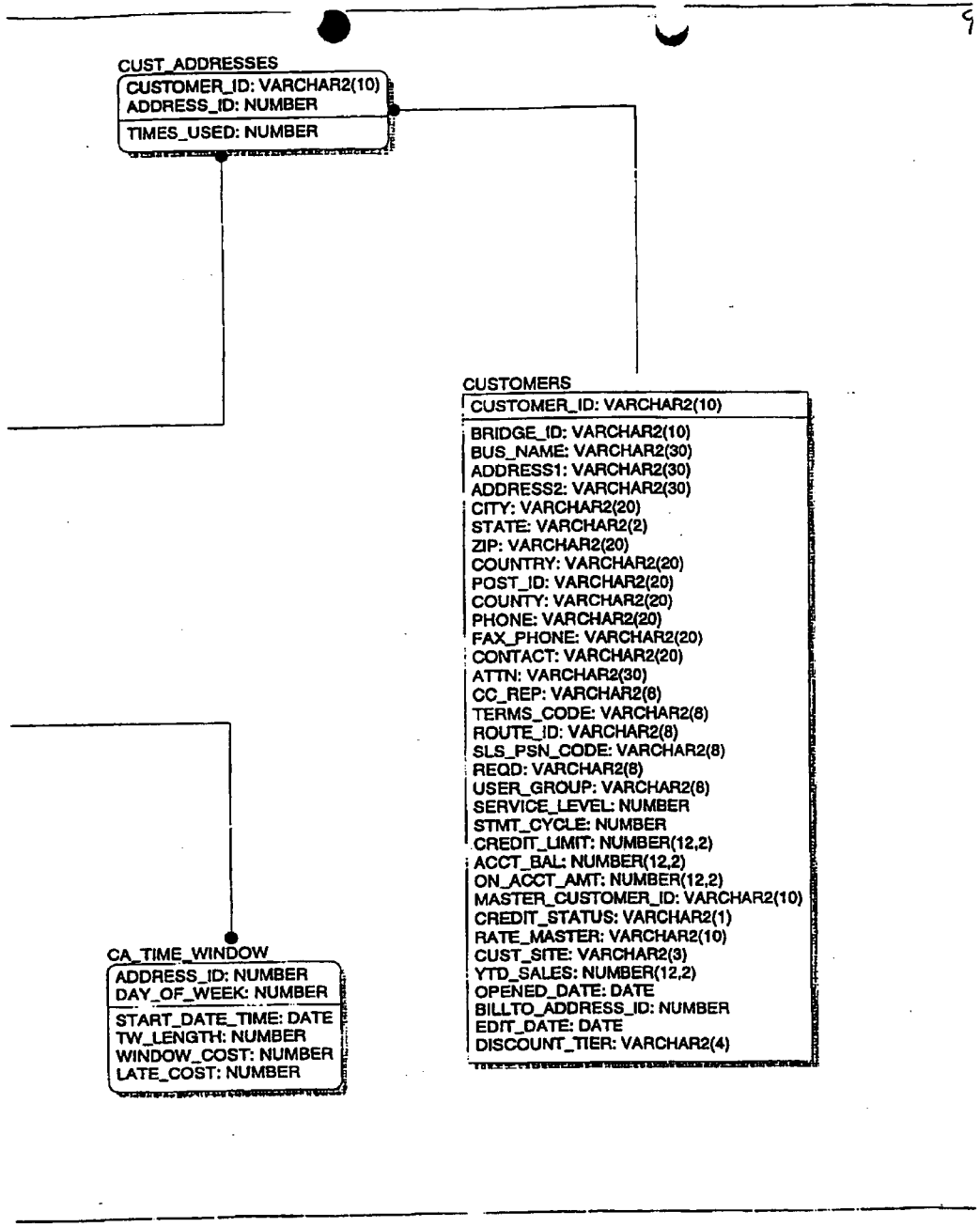

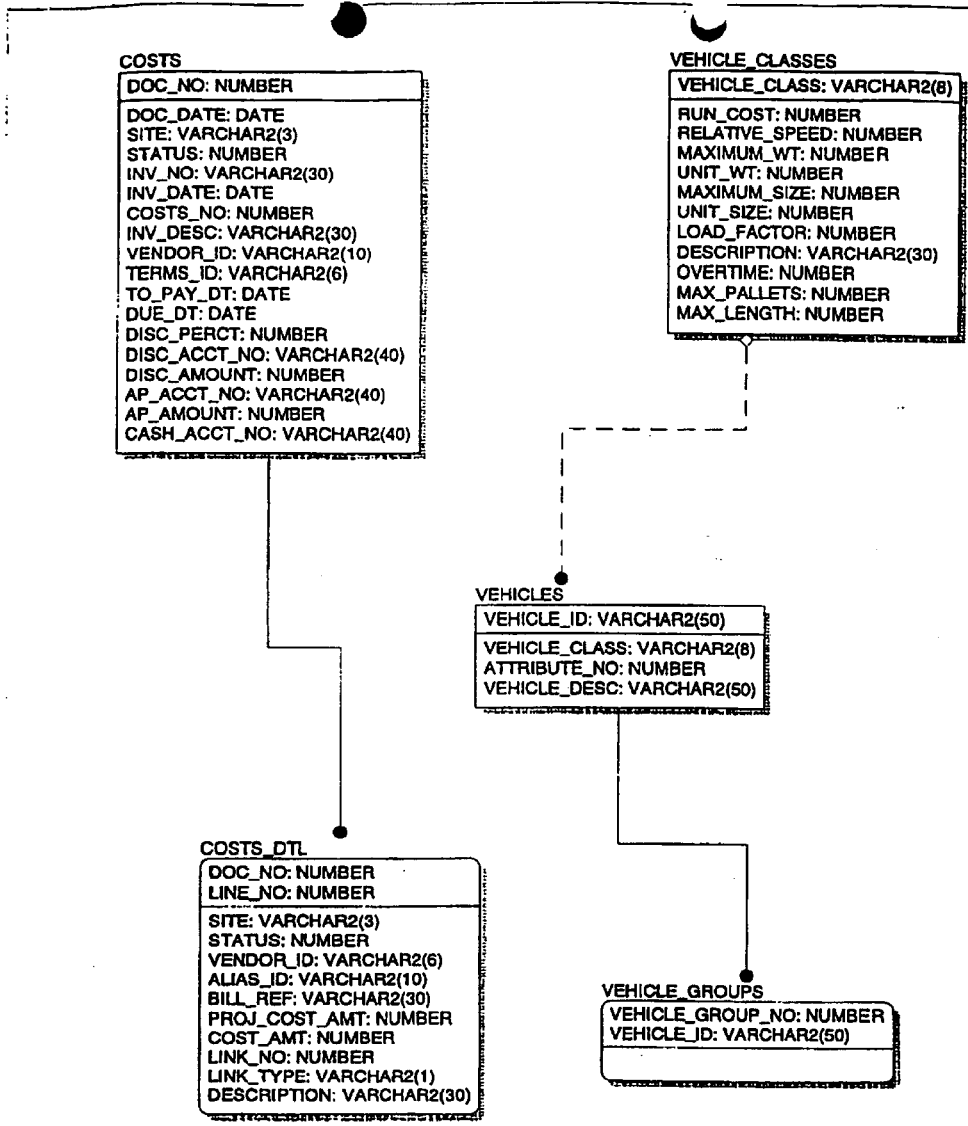

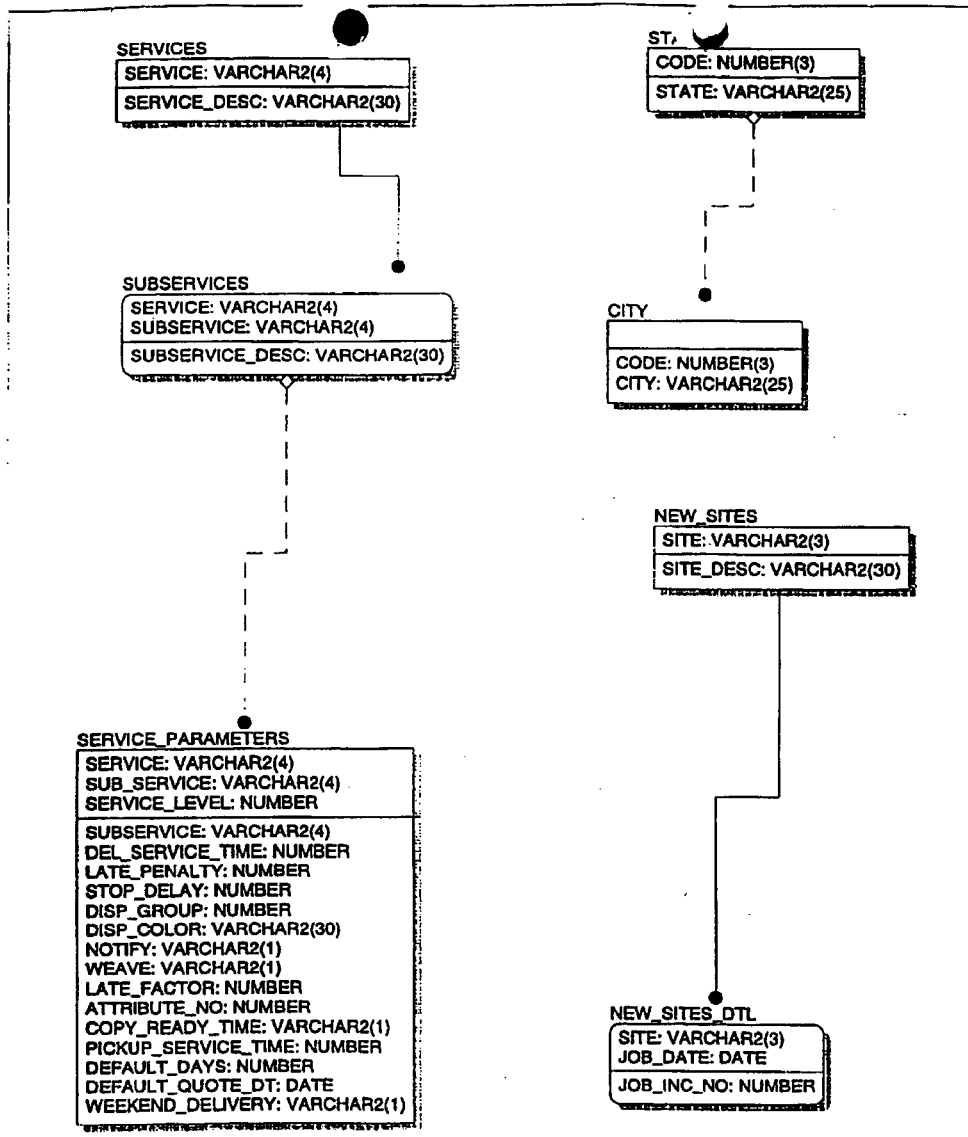

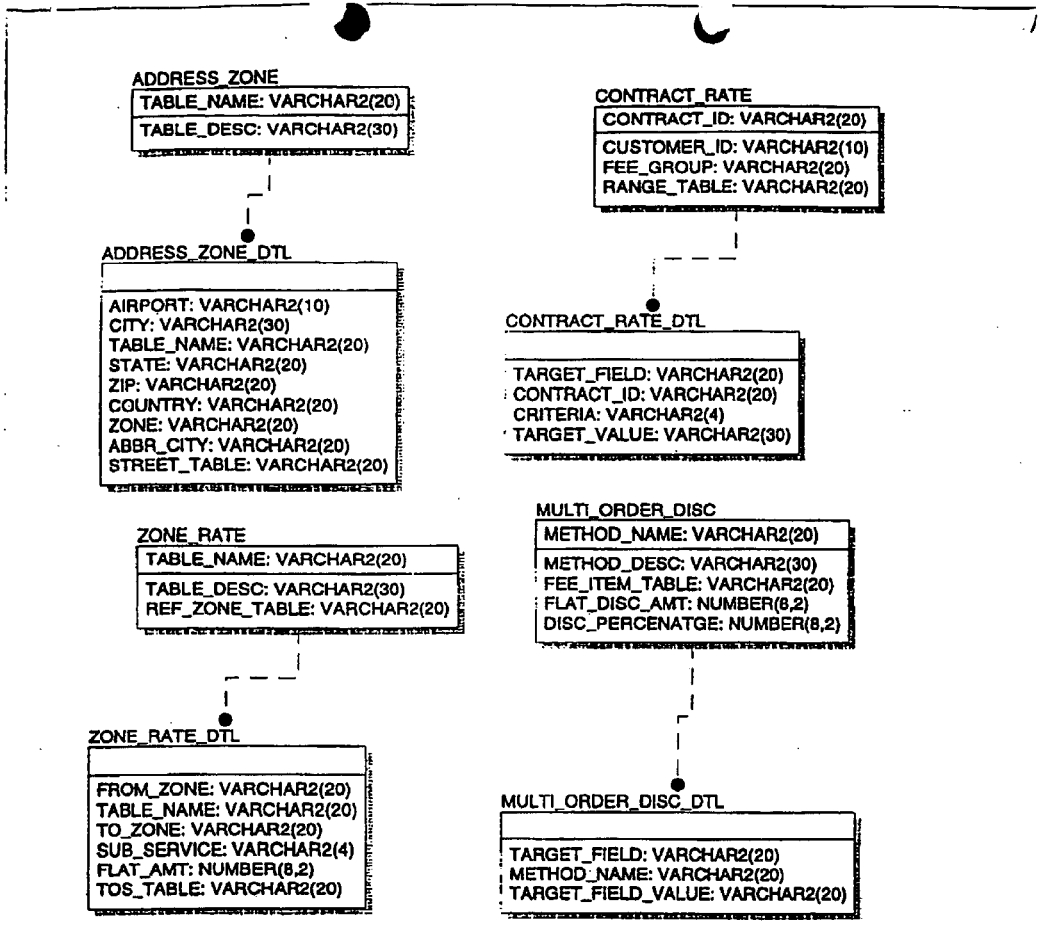

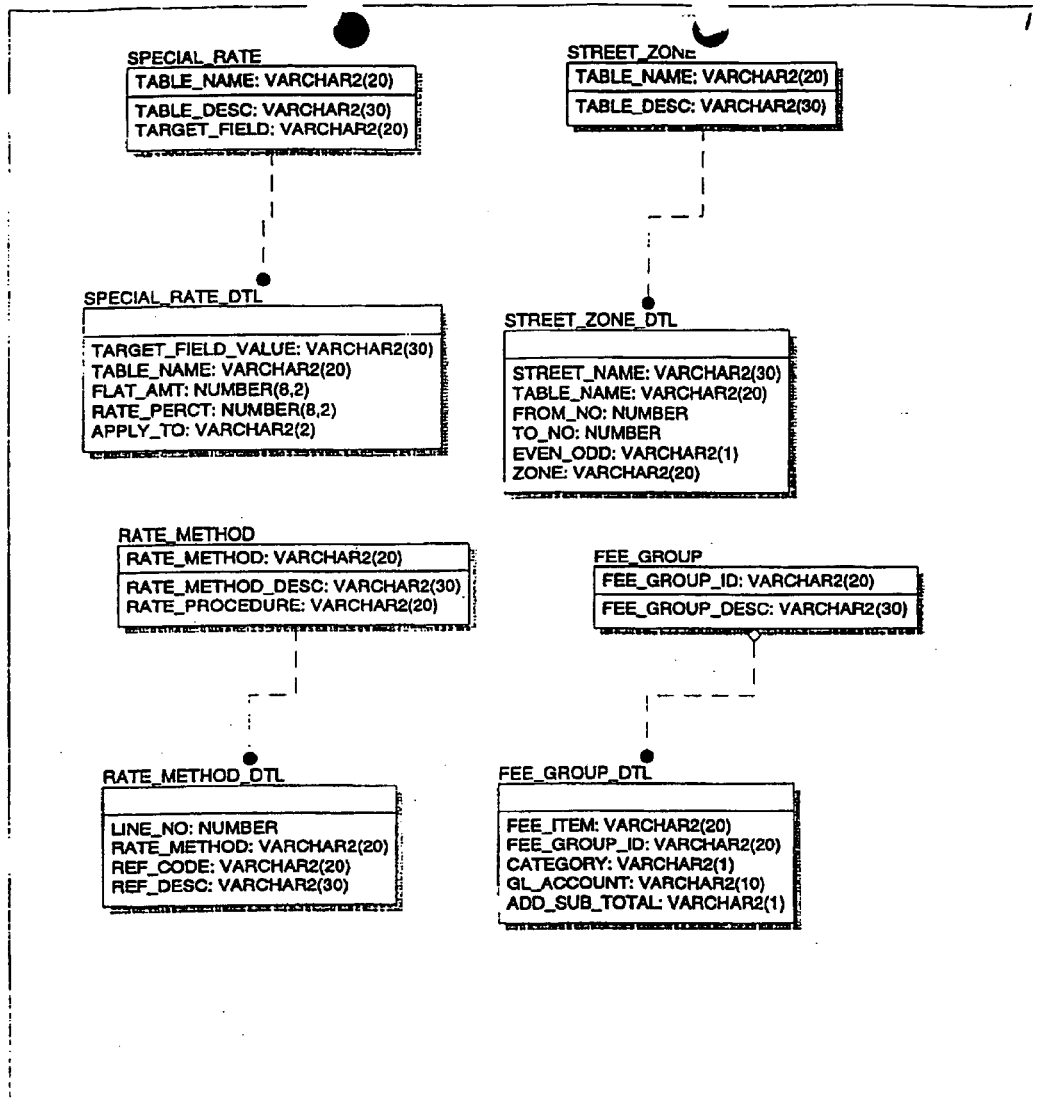

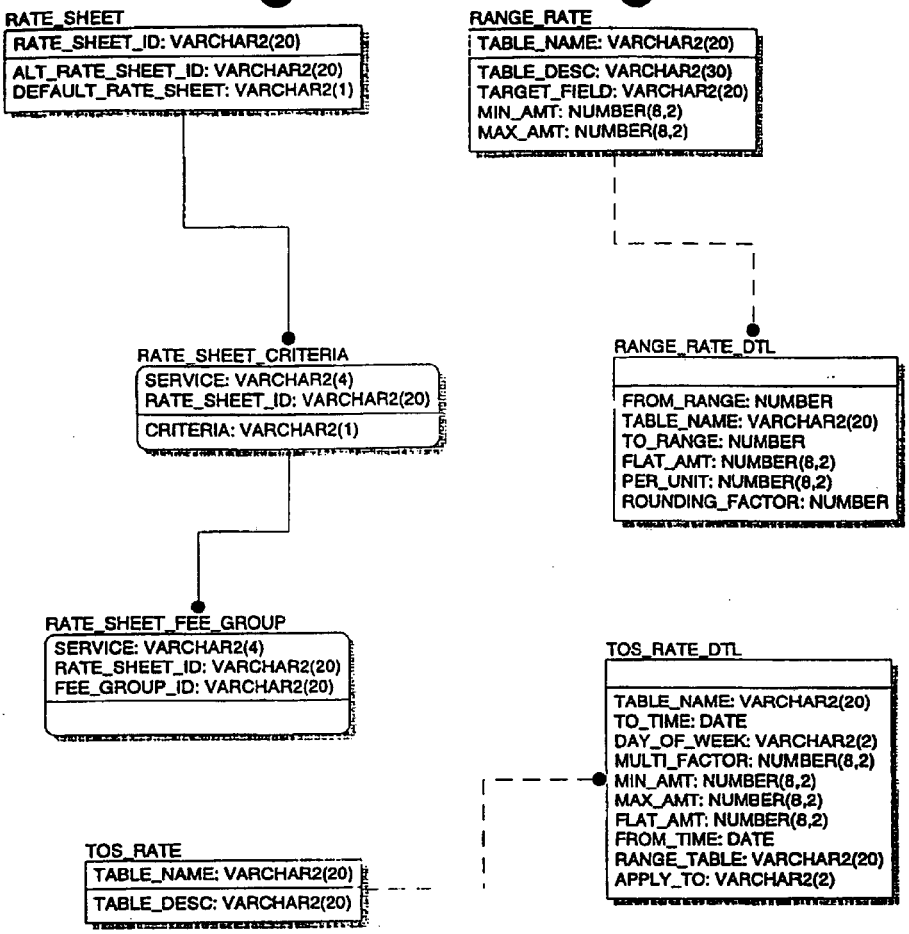

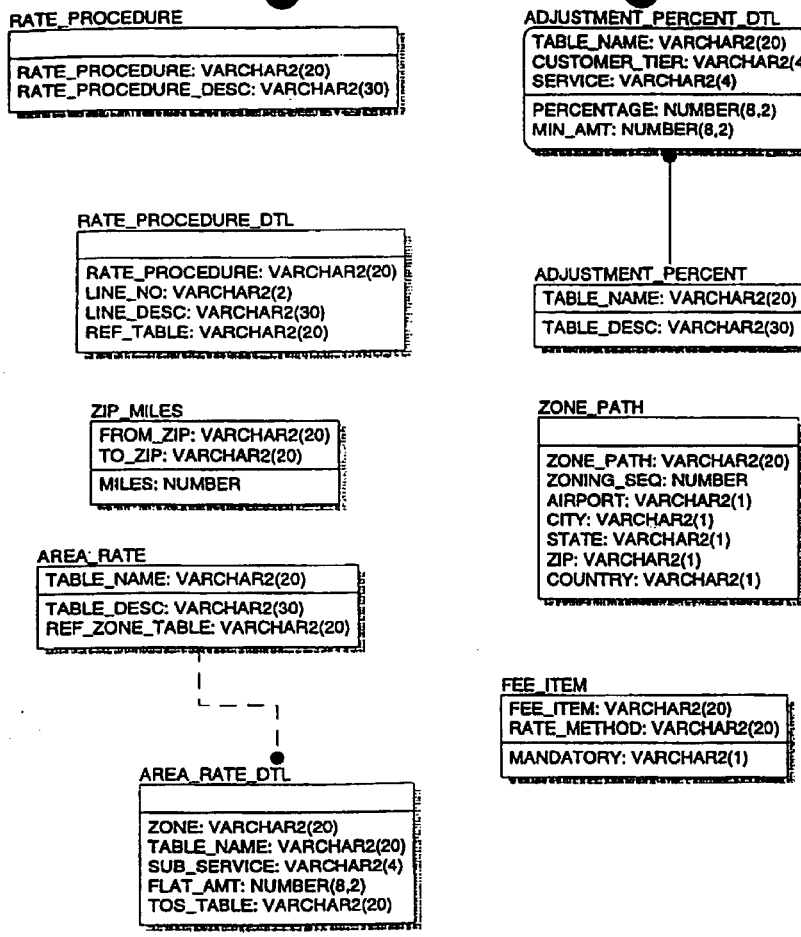

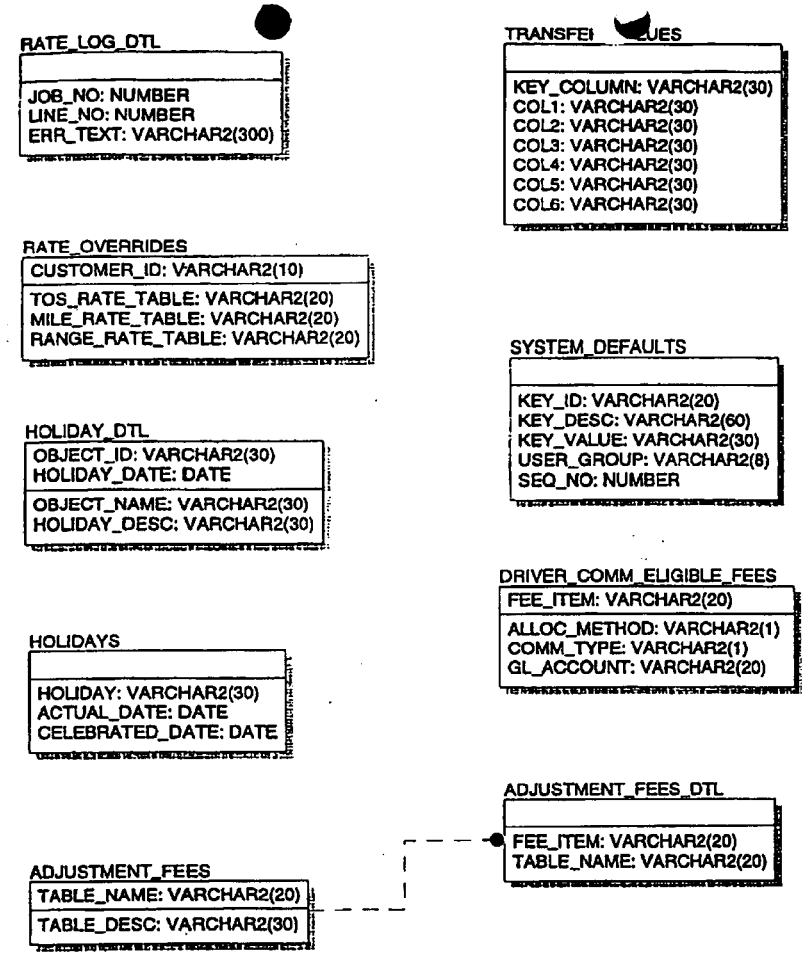

ACCT_NUMBERS

GL_ACCT: VARCHAR2(30)
GL_ACCT_DESC: VARCHAR2(50)

ACCT_TRANS_HDR

TRANS_NO: NUMBER
TRANS_TYPE: VARCHAR2(12)

TRANS_DATE: DATE
TRANS_ID: VARCHAR2(20)
TRANS_AMOUNT: NUMBER
TRANS_BATCH_NO: NUMBER
LINK_NO: NUMBER
NO_OF_PRINTS: NUMBER

ACCT_SETUP

ACCT_PACKAGE: VARCHAR2(30)
TRANSFER_DIR: VARCHAR2(100)
CUST_ID_LENGTH: NUMBER
VEND_ID_LENGTH: NUMBER
LAST_EXPORT_AR: DATE
LAST_EXPORT_AP: DATE
AR_INV_TYPE: VARCHAR2(12)
AP_INV_TYPE: VARCHAR2(12)
AR_CM_TYPE: VARCHAR2(12)
AR_DM_TYPE: VARCHAR2(12)
CUST_FILE: VARCHAR2(30)
VEND_FILE: VARCHAR2(30)
AR_HDR_FILE: VARCHAR2(30)
AR_DET_FILE: VARCHAR2(30)
AP_HDR_FILE: VARCHAR2(30)
AP_DET_FILE: VARCHAR2(30)

ACCT_BATCH

BATCH_NO: NUMBER
GL_TYPE: VARCHAR2(2)

BATCH_FILES_DONE: VARCHAR2(1)
CREATE_DATE: DATE

CUST_TERMS

CUST_TERMS: VARCHAR2(15)
SEQ_NO: NUMBER

ACCT_TRANS_DTL

TRANS_NO: NUMBER
TRANS_TYPE: VARCHAR2(12)
TRANS_GL_ACCT: VARCHAR2(30)

TRANS_DATE: DATE
TRANS_DB_CR: NUMBER
TRANS_DESC: VARCHAR2(30)

© COPYRIGHT MOBILE INFORMATION SYSTEMS, INC. 1998

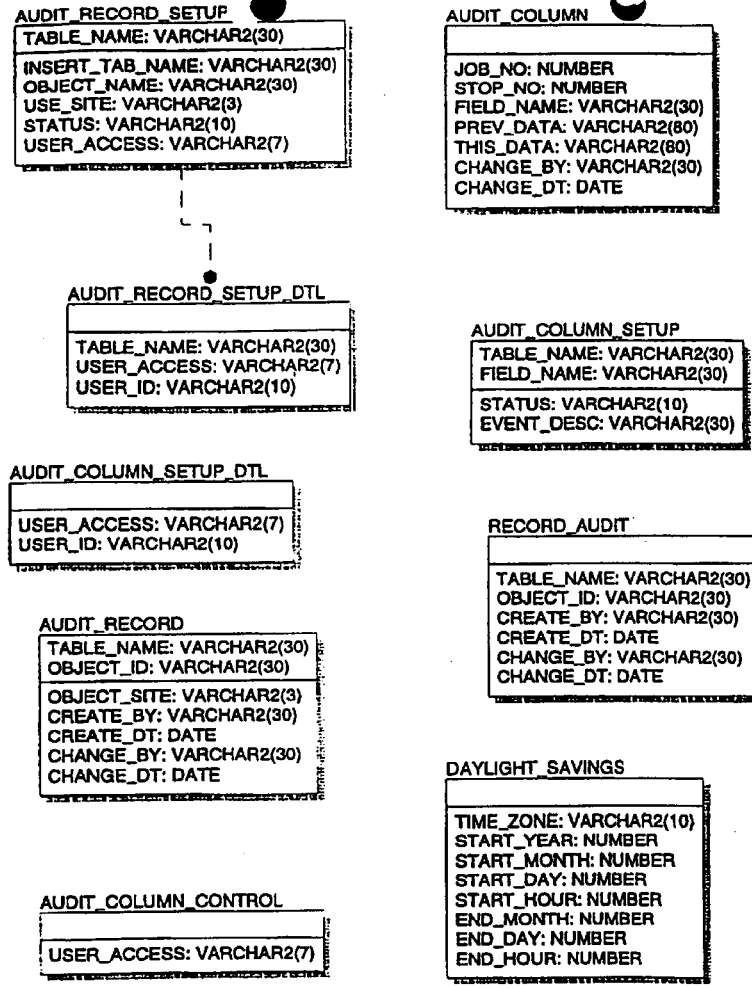

USER_GROUPS
| USER_GROUP: VARCHAR2(8) |
| GROUP_DESC: VARCHAR2(30) |

AIRPORTS
| AIRPORT: VARCHAR2(10) |
| AIRPORT_NAME: VARCHAR2(30) |
| CITY: VARCHAR2(30) |
| STATE: VARCHAR2(20) |
| ZIP: VARCHAR2(20) |
| COUNTRY: VARCHAR2(20) |
| INTERNATIONAL: VARCHAR2(1) |
| DEFAULT_CARRIER: VARCHAR2(10) |
| DEFAULT_SITE: VARCHAR2(4) |

NEW_USERS
| USER_ID: VARCHAR2(10) |
| SITE: VARCHAR2(3) |
| FIRST_NAME: VARCHAR2(20) |
| LAST_NAME: VARCHAR2(20) |
| MID_INITIAL: VARCHAR2(1) |
| DEPT: VARCHAR2(3) |
| USER_PHONE: VARCHAR2(15) |
| USER_GROUP: VARCHAR2(8) |
| TIME_ZONE: VARCHAR2(12) |

COMPANY
| COMPANY_NAME: VARCHAR2(30) |
| ADDRESS1: VARCHAR2(30) |
| ADDRESS2: VARCHAR2(30) |
| CITY: VARCHAR2(20) |
| STATE: VARCHAR2(2) |
| ZIP: VARCHAR2(20) |
| COUNTRY: VARCHAR2(30) |
| COUNTY: VARCHAR2(30) |
| POST_ID: VARCHAR2(20) |
| DEFAULT_SITE: VARCHAR2(3) |
| DEFAULT_USER_GROUP: VARCHAR2(8) |

COMMON_PHONES
| CUSTOMER_ID: VARCHAR2(10) |
| COMMON_PHONE: VARCHAR2(20) |

WEEKEND_DTL
| OBJECT_ID: VARCHAR2(30) |
| WEEKEND_DAY: NUMBER |
| OBJECT_NAME: VARCHAR2(30) |
| WEEKEND_DESC: VARCHAR2(30) |

CITY_STATES
| CITY: VARCHAR2(30) |
| STATE: VARCHAR2(20) |
| ZIP: VARCHAR2(20) |
| COUNTRY: VARCHAR2(20) |
| DEFAULT_SITE: VARCHAR2(4) |
| TIME_ZONE: VARCHAR2(10) |

EVENT_LIST
| EVENT_NO: NUMBER |
| EVENT_NAME: VARCHAR2(30) |

© Copyright Mobile Information Systems, Inc. 1998

VENDORS

| VENDOR_ID: VARCHAR2(10) |
|---|
| BUS_NAME: VARCHAR2(30) |
| PHONE: VARCHAR2(20) |
| FAX_PHONE: VARCHAR2(20) |
| ADDRESS1: VARCHAR2(30) |
| ADDRESS2: VARCHAR2(30) |
| CITY: VARCHAR2(20) |
| STATE: VARCHAR2(2) |
| ZIP: VARCHAR2(10) |
| COUNTRY: VARCHAR2(20) |
| TERMS_ID: VARCHAR2(10) |
| HOLD_PAYMENT: VARCHAR2(1) |
| PRINT_1099: VARCHAR2(1) |
| FED_TAX_ID: VARCHAR2(11) |
| CREATE_DATE: DATE |
| EDIT_DATE: DATE |

LOADED_DAILIES

| TEMPLATE_JOB_NO: NUMBER |
|---|
| LOADED_PU_READY_DT: DATE |
| LOADED_JOB_NO: NUMBER |

PROCESSES

| PROC_NAME: VARCHAR2(8) |
|---|
| PROC_TYPE: VARCHAR2(8) |
| EMAIL_NAME: VARCHAR2(10) |
| DEAD_TIME: NUMBER |
| NUM_TRIES: NUMBER |

ALL_FAIL_JOBS

| FAIL_SEQNO: NUMBER |
|---|
| DOC_NO: VARCHAR2(30) |
| ERROR_NO: NUMBER |
| SEVERITY_LEVEL: NUMBER |
| SOURCE: VARCHAR2(20) |
| CATEGORY: VARCHAR2(20) |
| TEXT_MSG: VARCHAR2(200) |
| TIME_STAMP: DATE |
| SITE: VARCHAR2(3) |

PROCESS_EVENT

| |
|---|
| PROC_NAME: VARCHAR2(8) |
| EVENT_NO: NUMBER |
| EVENT_NAME: VARCHAR2(30) |
| SITE: VARCHAR2(3) |

PROCESS_SITE

| PROC_NAME: VARCHAR2(8) |
|---|
| SITE: VARCHAR2(3) |
| HOST_NAME: VARCHAR2(10) |
| PROC_NO: NUMBER |
| STATUS: NUMBER |
| TIME_STAMP_DT: DATE |
| PROC_PATH: VARCHAR2(80) |

PROCESS_HISTORY

| |
|---|
| PROC_NAME: VARCHAR2(8) |
| TIME_STAMP_DT: DATE |
| NUM_DEATHS: NUMBER |
| SITE: VARCHAR2(3) |

© COPYRIGHT MOBILE INFORMATION SYSTEMS INC 1998

PRINTERS

PRINTER_NAME: VARCHAR2(30)
SITE: VARCHAR2(3)

PRINT_FORMAT

PRINT_KEY: VARCHAR2(20)
PRINT_DESC: VARCHAR2(30)
PRODUCT_NAME: VARCHAR2(30)
PRINT_STATUS: VARCHAR2(4)
STATUS_MESSAGE: VARCHAR2(60)
FILE_LOCATION: VARCHAR2(300)
DELETE_AFTER: NUMBER

PRINT_SETUP

PRINT_KEY: VARCHAR2(20)
SITE: VARCHAR2(3)
GROUP_DESC: VARCHAR2(30)

PRINT_SETUP_DTL

PRINT_KEY: VARCHAR2(30)
SITE: VARCHAR2(3)
PRINT_GROUP: VARCHAR2(20)
DESCRIPTION: VARCHAR2(30)

PRINT_QUEUE

PRINT_FILE: VARCHAR2(300)
OUTPUT_DEVICE: VARCHAR2(30)
DEVICE_NAME: VARCHAR2(60)
FAX_NUMBER: VARCHAR2(20)
FAX_ATTENTION: VARCHAR2(30)
FAX_SUBJECT: VARCHAR2(60)
NOTE1: VARCHAR2(30)
NOTE2: VARCHAR2(30)
NOTE3: VARCHAR2(30)
NOTE4: VARCHAR2(30)
NOTE5: VARCHAR2(30)
NOTE6: VARCHAR2(30)
NOTE7: VARCHAR2(30)
NOTE8: VARCHAR2(30)
USER_ID: VARCHAR2(10)
CREATE_TIME: DATE
REPORT_CREATED: DATE
QUE_RECEIVED: DATE
QUE_PROCESSED: DATE

PRINT_GROUP

PRINT_GROUP: VARCHAR2(20)
SITE: VARCHAR2(3)
OUTPUT_DEVICE: VARCHAR2(30)
DEVICE_NAME: VARCHAR2(60)

© COPYRIGHT MOBILE INFORMATION SYSTEMS, INC. 1995

GPS

| GPS_NO: NUMBER |
|---|
| COMMS_NO: NUMBER |
| DRIVER_NO: NUMBER |
| SITE: VARCHAR2(3) |
| VEHICLE_ID: VARCHAR2(50) |
| GPS_DT: DATE |
| INSERT_DT: DATE |
| LATITUDE: NUMBER(14) |
| LONGITUDE: NUMBER(16) |
| ALTITUDE: NUMBER |
| SPEED: NUMBER |
| HEADING: NUMBER |
| GPS_STATUS: NUMBER |
| MSG_STATUS: NUMBER |
| BLOCK_NO: NUMBER |
| STREET: VARCHAR2(30) |
| X_STREET: VARCHAR2(30) |
| CITY: VARCHAR2(20) |
| STATE: VARCHAR2(2) |
| ZIP: VARCHAR2(10) |

COMMS_STATUSES

| COMMS_NO: NUMBER |
|---|
| DISTANCE: NUMBER |
| MAX_SPEED: NUMBER |
| DRIVING_TIME: NUMBER |
| TOTAL_MESSAGES: NUMBER |
| SATS_VISIBLE: NUMBER |
| SATS_TRACKED: NUMBER |
| STATUS_1: NUMBER |
| STATUS_2: NUMBER |
| STATUS_3: NUMBER |
| STATUS_4: NUMBER |
| STATUS_5: NUMBER |
| STATUS_6: NUMBER |
| STATUS_7: NUMBER |
| STATUS_8: NUMBER |
| STATUS_9: NUMBER |
| STATUS_10: NUMBER |
| STATUS_11: NUMBER |
| STATUS_12: NUMBER |
| STATUS_13: NUMBER |
| STATUS_14: VARCHAR2(30) |
| STATUS_15: VARCHAR2(30) |
| INSERT_DT: DATE |

GATEWAY_LIST

| |
|---|
| GWNAME: VARCHAR2(15) |

PLANNER_DEFAULTS

| SITE: VARCHAR2(3) |
|---|
| SERVICE: VARCHAR2(4) |
| STATUS: NUMBER |
| DISP_STATION: NUMBER |
| COLOR: VARCHAR2(15) |

© COPYRIGHT MOBILE INFORMATION SYSTEMS, INC. 1998

PROCESS_STATUS

PROC_NAME: VARCHAR2(20)
PROC_TYPE: VARCHAR2(8)
SITE: VARCHAR2(3)
PROC_PATH: VARCHAR2(100)
HOST_NAME: VARCHAR2(20)
EMAIL_NAME: VARCHAR2(50)
RESTART_DELAY: NUMBER
NUM_RETRIES: NUMBER
RETRY_WINDOW: NUMBER
PID: NUMBER
POLLING_ON: VARCHAR2(1)
MSG_NO: NUMBER
CURRENT_STATE: VARCHAR2(10)
REQ_STATE: VARCHAR2(10)
LAST_ENTRY_DT: DATE

PACKAGE_TRACK

JOB_NO: NUMBER
STOP_NO: NUMBER
STOP_TYPE: VARCHAR2(1)
PIECES_ID: VARCHAR2(30)
UNITS: NUMBER
WEIGHT: NUMBER
DESCRIPTION: VARCHAR2(60)
TIME_STAMP_DT: DATE

NAVIGATE_TEMPLATE

TEMPLATE_NO: NUMBER
FORM_NAME: VARCHAR2(40)
CUR_FIELD: VARCHAR2(35)
NEXT_FIELD: VARCHAR2(35)
PREV_FIELD: VARCHAR2(35)
FIELD_ORDER: NUMBER
BLOCK_NAME: VARCHAR2(40)
NEXT_BLOCK: VARCHAR2(40)
PREV_BLOCK: VARCHAR2(40)
USER_ID: VARCHAR2(10)

POST_BOX

MSG_NO: NUMBER

REPLY_NO: NUMBER
OBJECT_EVENT: VARCHAR2(10)
OBJECT_TYPE: VARCHAR2(12)
OBJECT_ID: VARCHAR2(20)
SUPER_OBJECT_TYPE: VARCHAR2(15)
SUPER_OBJECT_ID: VARCHAR2(20)
ORIGIN: VARCHAR2(30)
OBJECT_STATUS: NUMBER
TIME_STAMP_DT: DATE
SITE: VARCHAR2(3)

SUP_TASK

TASK_NO: NUMBER

TASK_STATUS: VARCHAR2(1)
CURRENT_STATUS: VARCHAR2(12)
SUMMARY: VARCHAR2(160)
PROGRAM_NAME: VARCHAR2(20)
SCREEN_NAME: VARCHAR2(20)
CREATED_BY: VARCHAR2(10)
CREATED_DATE: DATE
ASSIGNED_TO: VARCHAR2(10)
COMPLETED_DATE: DATE
TOTAL_HOURS: NUMBER

SUP_TASK_DTL

TASK_NO: NUMBER
LINE_NO: NUMBER
TASK_DESC: VARCHAR2(320)
TASK_DT: DATE
TASK_WHO: VARCHAR2(8)

© COPYRIGHT MOBILE INFORMATION SYSTEMS, INC. 1998

What is claimed is:

1. A method for integrating a fleet management system onto legacy systems, said method comprising:
providing a fleet management system on a first platform;
providing a legacy system on a second platform;
providing a database; and
integrating said fleet management system comprising raster data and vector data to said legacy system using said database and a host gateway, said raster data and said vector data being used to display a digital map.

2. The method of claim 1 wherein said host gateway comprises an MIS gateway.

3. The method of claim 1 wherein said step of integrating provides a TCP/IP interface between said fleet management system and said legacy system.

4. A system for fleet management, said system comprising:
a legacy system, said legacy system being selected from a yard management system, a dock management system, a warehouse management system;
a fleet management system comprising raster data and vector data to display a digital map;
a database; and
a gateway coupling said legacy system to said database and said fleet management system.

5. The system of claim 4 wherein said gateway comprises said database.

6. The system of claim 4 wherein said gateway coupling said legacy system and said fleet management system comprises a TCP/IP interface.

7. A method for tracking at least one of a plurality of products, comprising:
receiving arrival information from a legacy system about at least one of a plurality of vehicles transporting said at least one of a plurality of products at a distribution point;
receiving unloading information about said at least one of a plurality of products from said at least one of a plurality of vehicles transporting said at least one of a plurality of products, said unloading information being generated at said distribution point;
receiving storage information about said at least one of a plurality of products, said storage information resulting from storing said at least one of a plurality of products at said distribution point;
incorporating said arrival information, unloading information and storage information into a database to provide routing information for said at least one of a plurality of vehicles transporting said at least one of a plurality of products.

8. The method of claim 7 further comprising receiving loading information about said at least one of a plurality products being loaded onto said at least one of a plurality of vehicles transporting said at least one of a plurality of products at said distribution point.

9. The method of claim 7 further comprising receiving departure information about said at least one of a plurality of vehicles transporting said at least one of a plurality of products from said distribution point.

10. The method of claim 7 wherein said legacy system comprises a yard management system.

11. The method of claim 7 wherein said unloading information about said at least one of a plurality of products is received from a dock management system.

12. The method of claim 7 wherein said storage information about said at least one of a plurality of products is received from a warehouse management system.

13. The method of claim 7 wherein said routing information about said at least one of a plurality of vehicles transporting said at least one of a plurality of products comprises a fleet management system.

14. The method of claim 7 wherein said arrival information, loading information and storage information are received by a host gateway.

15. The method of claim 14 wherein said host gateway receives said arrival information, loading information and storage information through a TCP/IP socket.

16. A method for integrating a fleet management system onto business systems, said method comprising:
providing a fleet management system on a first platform, said fleet management system comprising raster data and vector data, said raster data and said vector data being used to display a digital map;
providing a business management system on a second platform;
providing at least one of a plurality of interfaces, said interface capable of adapting said fleet management system on said first platform to said business management system on said second platform;
providing a database;
providing a host gateway for routing messages from said fleet management system to said business management system through said at least one of a plurality of interfaces; and
integrating said fleet management system to said business management system using said host gateway and said database and said at least one of said plurality of interfaces.

17. The method of claim 16 wherein said host gateway comprises a plurality of tools.

18. The method of claim 16 wherein said step of integrating provides a TCP/IP interface between said fleet management system and said business management system.

19. A method for tracking a plurality of product location information, comprising:
providing an interface to at least one legacy business management system, said legacy business management system being selected from a yard management system, a dock management system, a warehouse management system;
providing a fleet management system;
providing a database;
coupling said legacy business management system to said fleet management system and said database through said interfaces, wherein said at least one interface is operable to translate information to said legacy business management system from said fleet management system and to translate information to said fleet management system from said legacy business management system.

20. The method of claim 19 wherein said fleet management system is coupled to said legacy business management system using a plurality of messages.

21. The method of claim 19 wherein said messages are transmitted using the TCP/IP protocol.

22. A method for tracking at least one of a plurality of products, comprising:
receiving arrival information from a legacy system about at least one of a plurality of vehicles transporting said at least one of a plurality of products at a distribution point, wherein said legacy system comprises a yard management system;

receiving unloading information about said at least one of a plurality of products from said at least one of a plurality of vehicles transporting said at least one of a plurality of products, said unloading information being generated at said distribution point, wherein said unloading information about said at least one of a plurality of products is received from a dock management system;

receiving storage information about said at least one of a plurality of products, said storage information resulting from storing said at least one of a plurality of products at said distribution point, wherein said storage information about said at least one of a plurality of products is received from a warehouse management system;

receiving loading information about said at least one of a plurality products being loaded onto said at least one of a plurality of vehicles transporting said at least one of a plurality of products at said distribution point, wherein said loading information about said at least one of a plurality of products is received from a dock management system;

receiving departure information about said at least one of a plurality of vehicles transporting said at least one of a plurality of products from said distribution point, wherein said departure information about said at least one of a plurality of vehicles transporting said at least one of a plurality of products is received from a yard management system; and incorporating said arrival information, loading information, storage information, unloading information and departure information into a database to provide routing information for said at least one of a plurality of vehicles transporting said at least one of a plurality of products wherein said routing information about said at least one of a plurality of vehicles transporting said at least one of a plurality of products comprises a fleet management system, wherein said arrival information, loading information and storage information are received by a host gateway through a TCP/IP socket.

* * * * *